(12) United States Patent
Otani et al.

(10) Patent No.: US 10,695,661 B2
(45) Date of Patent: Jun. 30, 2020

(54) GAME CONTROL DEVICE, GAME SYSTEM, AND INFORMATION STORAGE MEDIUM

(71) Applicant: KONAMI DIGITAL ENTERTAINMENT CO., LTD., Tokyo (JP)

(72) Inventors: Tokifune Otani, Minato-ku (JP); Taku Endo, Minato-ku (JP); Kenji Yokoyama, Minato-ku (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 625 days.

(21) Appl. No.: 15/256,720

(22) Filed: Sep. 5, 2016

(65) Prior Publication Data

US 2016/0367892 A1 Dec. 22, 2016

Related U.S. Application Data

(63) Continuation of application No. PCT/JP2015/055792, filed on Feb. 27, 2015.

(30) Foreign Application Priority Data

Mar. 7, 2014 (JP) ................................. 2014-045745

(51) Int. Cl.
*G06F 3/01* (2006.01)
*A63F 13/2145* (2014.01)
(Continued)

(52) U.S. Cl.
CPC ........ *A63F 13/2145* (2014.09); *A63F 13/285* (2014.09); *A63F 13/426* (2014.09);
(Continued)

(58) Field of Classification Search
CPC ..... G06F 1/1692; G06F 3/04886; G06F 3/016
See application file for complete search history.

(56) References Cited

U.S. PATENT DOCUMENTS

2004/0263472 A1* 12/2004 Tachikawa .............. G06F 3/038
345/156
2008/0026843 A1* 1/2008 Nakasaka ............... A63F 13/00
463/37
(Continued)

FOREIGN PATENT DOCUMENTS

JP 2012-150833 A 8/2012
JP 2014-028059 A 2/2014

OTHER PUBLICATIONS

Computer generated English translation of the office action for KR application No. 10-2016-7024315.

*Primary Examiner* — James S. McClellan
*Assistant Examiner* — Kevin M Carter
(74) *Attorney, Agent, or Firm* — HEA Law PLLC

(57) ABSTRACT

A game control device comprising at least one processor configured to: receive direction input by determining which region, among a plurality of regions set so as to respectively correspond to a plurality of directions, a touch position detected by a touch panel is included in; determine whether or not the touch position has changed from being in one region to being in another region among the plurality of regions; and cause the touch panel to vibrate if the touch position has changed from being in the one region to being in the another region.

19 Claims, 21 Drawing Sheets

(51) Int. Cl.
*A63F 13/52* (2014.01)
*A63F 13/426* (2014.01)
*A63F 13/285* (2014.01)
*A63F 13/53* (2014.01)
*G06F 3/0484* (2013.01)
*G06F 3/0354* (2013.01)
*G06F 3/0488* (2013.01)
*A63F 13/92* (2014.01)

(52) U.S. Cl.
CPC .............. *A63F 13/52* (2014.09); *A63F 13/53* (2014.09); *A63F 13/92* (2014.09); *G06F 3/016* (2013.01); *G06F 3/03547* (2013.01); *G06F 3/04847* (2013.01); *G06F 3/04886* (2013.01); *G06F 2203/013* (2013.01)

(56) References Cited

U.S. PATENT DOCUMENTS

| | | | |
|---|---|---|---|
| 2009/0175542 A1* | 7/2009 | Okamura | G06F 3/04842 382/203 |
| 2011/0136557 A1* | 6/2011 | Terada | A63F 13/10 463/4 |
| 2011/0199312 A1* | 8/2011 | Okuta | G06F 3/0416 345/173 |
| 2011/0212776 A1* | 9/2011 | Kishimoto | A63F 13/803 463/31 |
| 2011/0285636 A1* | 11/2011 | Howard | G06F 3/04815 345/173 |
| 2012/0019472 A1* | 1/2012 | Tomita | A63F 13/812 345/173 |
| 2012/0162114 A1* | 6/2012 | Inoue | G06F 3/016 345/173 |
| 2013/0038623 A1* | 2/2013 | Tezuka | G06F 3/04886 345/589 |
| 2013/0053143 A1* | 2/2013 | Yamamoto | A63F 13/10 463/31 |
| 2014/0038717 A1 | 2/2014 | Lee | |
| 2014/0066195 A1* | 3/2014 | Matsui | A63F 13/42 463/30 |
| 2014/0098038 A1* | 4/2014 | Paek | G06F 1/1692 345/173 |

* cited by examiner

FIG.11

| TOUCH POSITION | | — — — |
|---|---|---|
| TOUCH REGION HISTORY | CURRENT | UP REGION |
| | IMMEDIATELY BEFORE | LEFT REGION |
| VIBRATION STANDBY FLAG | | 1 |
| POSITION OF USER CHARACTER | | — — — |
| ORIENTATION OF USER CHARACTER | | — — — |
| POSITION OF BUTTERFLY CHARACTER | | — — — |

FIG.18

| RATE OF CHANGE (v) | MAGNITUDE OF VIBRATION |
|---|---|
| $0 < v \leqq V1$ | M1 |
| $V1 < v \leqq V2$ | M2 |
| $V2 < v$ | M3 |

| DISTANCE (d) | MAGNITUDE OF VIBRATION |
|---|---|
| $0 < d \leqq D1$ | M1 |
| $D1 < d \leqq D2$ | M2 |
| $D2 < d$ | M3 |

※ $M1 < M2 < M3$

GAME CONTROL DEVICE, GAME SYSTEM, AND INFORMATION STORAGE MEDIUM

CROSS-REFERENCE TO RELATED APPLICATION

The present disclosure contains subject matter related to that disclosed in Japanese Patent Application JP2014-045745 filed in the Japan Patent Office on Mar. 7, 2014 and International Patent Application PCT/JP2015/055792 filed in the Japan Patent Office on Feb. 27, 2015, the entire contents of which are hereby incorporated by reference.

BACKGROUND OF THE INVENTION

1. Field of the Invention

The present invention relates to a game control device, a game system, and an information storage medium.

2. Description of the Related Art

A gamepad of a video game console or a portable game console includes a directional button or a directional lever for receiving a direction input operation. In contrast, for example, a terminal device, such as a smartphone or a tablet computer, includes a touch panel, and often does not include a directional button or a directional lever. In such a terminal device, direction input instructions are received via the touch panel by displaying a virtual directional button or a virtual directional lever on a screen (JP 2014-028059 A).

SUMMARY OF THE INVENTION

In the case of a real directional button or a real directional lever included in the gamepad or the like of a video game console, a user can obtain a tactile feeling by operating the directional button or the directional lever. In contrast, in the case of a virtual directional button or a virtual directional lever such as the ones described above, the user cannot obtain a tactile feeling by operating the directional button or the directional lever. As a result, when the user has performed an operation in order to change an input direction, there may be a case where the user has difficulty to grasp whether or not the input direction has actually been changed by that operation, leading to a difficulty in performing the direction input operation.

The present invention has been made in view of the above-mentioned problem. It is an object of the present invention to provide a game control device, a game system, a program, and an information storage medium, which are capable of assisting a user to more easily perform a direction input operation to be received via a touch panel.

In order to solve the problem described above, according to one embodiment of the present invention, there is provided a game control device comprising at least one processor configured to: receive direction input by determining which region, among a plurality of regions set so as to respectively correspond to a plurality of directions, a touch position detected by a touch panel is included in; determine whether or not the touch position has changed from being in one region to being in another region among the plurality of regions; and cause the touch panel to vibrate if the touch position has changed from being in the one region to being in the another region.

Further, according to one embodiment of the present invention, there is provided a game system, comprising at least one processor configured to: receive direction input by determining which region, among a plurality of regions set so as to respectively correspond to a plurality of directions, a touch position detected by a touch panel is included in; determine whether or not the touch position has changed from being in one region to being in another region among the plurality of regions; and cause the touch panel to vibrate if the touch position has changed from being in the one region to being in the another region.

BRIEF DESCRIPTION OF THE DRAWINGS

FIG. 11 is a table for showing an example of data stored in a storage unit.

FIG. 18 is a table for showing an example of correspondence relationship data.

FIG. 19 is a table for showing another example of correspondence relationship data.

DESCRIPTION OF THE EMBODIMENTS

Now, an exemplary embodiment of the present invention is described in detail with reference to the drawings.

Figure 1:
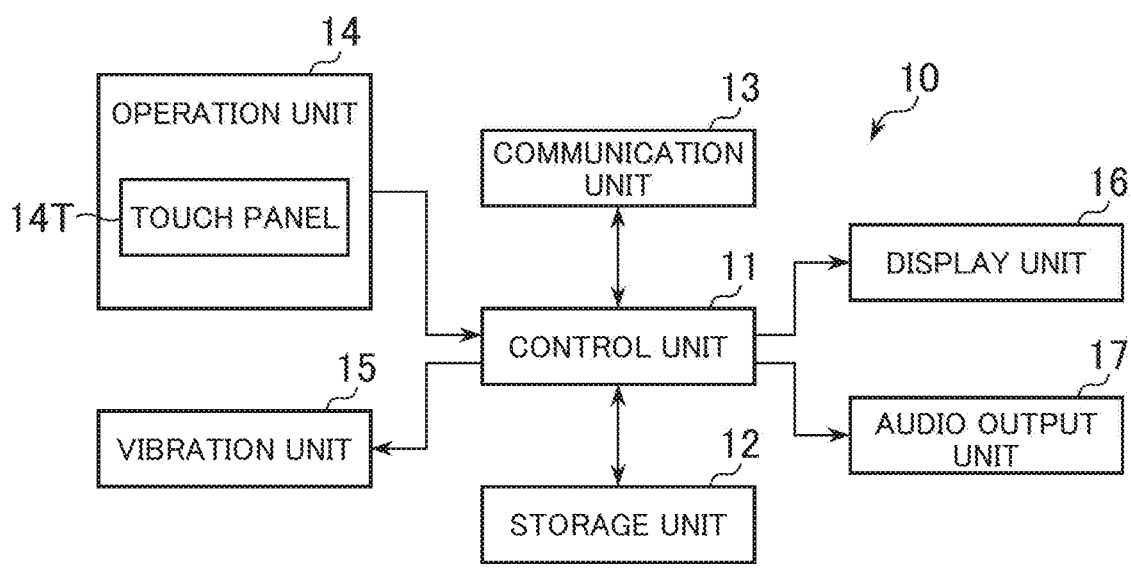
FIG. 1 is a diagram for illustrating an example of a hardware configuration of a game device (game control device).

In FIG. 1, a hardware configuration of the game device (game control device) according to the embodiment of the present invention is illustrated. A game device 10 is a computer configured to be used by a user in order to play a game. For example, the game device 10 is implemented by a mobile phone (including a smartphone), or a portable information terminal (including a tablet computer). The game device 10 may also be implemented by a portable game console, a video game console, a laptop computer, a desktop computer, or the like.

As illustrated in FIG. 1, the game device 10 includes a control unit 11, a storage unit 12, a communication unit 13, an operation unit 14, a vibration unit 15, a display unit 16, and an audio output unit 17.

The control unit 11 includes one or a plurality of microprocessors and executes processing in accordance with an operating system or another program. The storage unit 12 includes a main storage unit (e.g., RAM) and an auxiliary storage unit (e.g., hard disk drive or solid state drive). The communication unit 13 is configured to communicate data via a communication network.

The operation unit 14 is used by the user to perform game operations. The operation unit 14 includes, for example, a touch panel 14T capable of detecting a position touched by the user. The user performs a game operation by touching the touch panel 14T. For example, the touch panel 14T is overlaid on the display unit 16, and is configured to output a signal indicating a detection result. For example, detection of the touch position is repeatedly performed every predetermined time interval (e.g., 1/60 of a second). Various types of touch panels may be employed for the touch panel 14T. For example, a capacitive touch panel may be employed. In a capacitive touch panel, the position touched by the user is detected based on changes in electrical charge that occur when the surface of the touch panel is touched by the user. It is to be understood that a type of touch panel other than a capacitive touch panel may also be employed.

The vibration unit 15 is configured to cause the operation unit 14 to vibrate. For example, when the operation unit 14 is integrally formed with a casing (e.g., the casing of the game device 10 including the touch panel), such as in the case for a mobile phone (smartphone) or a portable information terminal (tablet computer), a vibration motor housed within the casing for causing the casing to vibrate corresponds to an example of the vibration unit 15. The control unit 11 is configured to generate vibrations by driving the vibration unit 15. The control unit 11 is, for example, capable of controlling a vibration mode. For example, the control unit 11 is capable of controlling a magnitude (amplitude), a length, or an interval (frequency) of the vibrations.

The display unit 16, which is a liquid crystal display panel, an organic electroluminescent (EL) display, or the like for example, is configured to display a screen based on an instruction from the control unit 11. The audio output unit 17, which is a speaker, a headphone, or the like for example, is configured to output audio data based on an instruction from the control unit 11.

A program or data is supplied to the game device 10 via the communication network. The game device 10 may include a component configured to read a program or data stored in an information recording medium (e.g., optical disc or memory card). Then, the program or data may be supplied to the game device 10 via the information recording medium.

The game device 10 is capable of executing various games. In the following description, as an example of a game executed by the game device 10, a game in which a user's operation target moves through a game space based on operations by the user is described. The "game space" may be a virtual three-dimensional space in which the position is represented by three coordinate axes perpendicular to each other, or a virtual two-dimensional space in which the position is represented by two coordinate axes perpendicular to each other.

Figure 2:
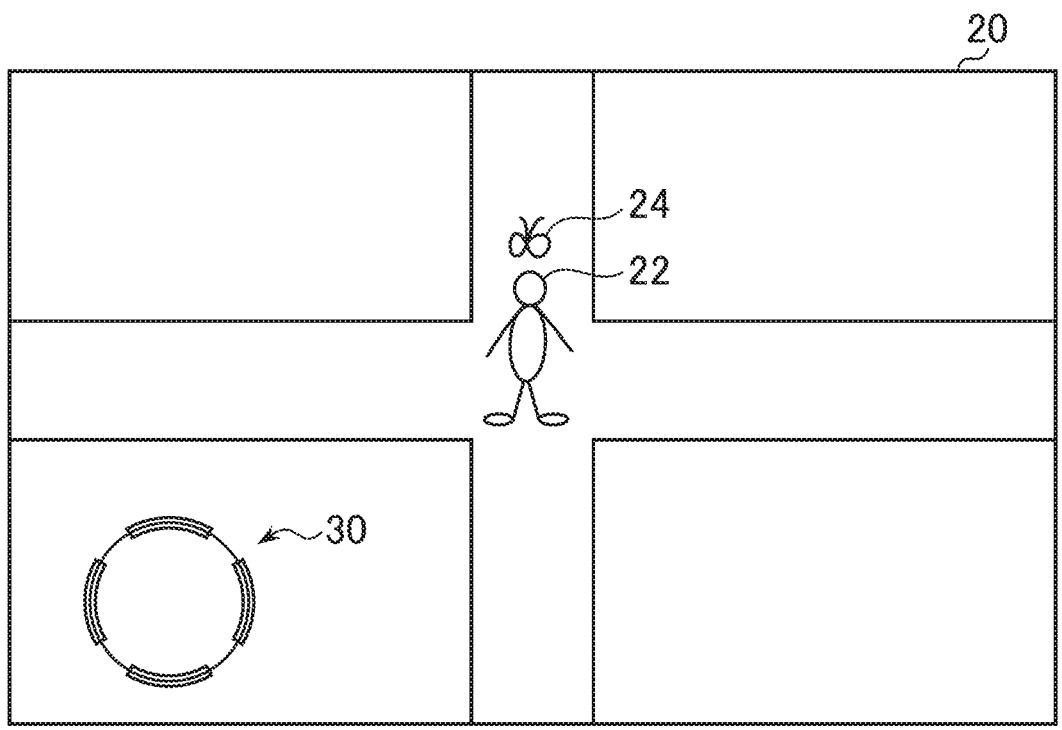
FIG. 2 is a diagram for illustrating an example of a game screen.

In FIG. 2, an example of the game screen displayed on the display unit 16 is illustrated. As illustrated in FIG. 2, a user character 22 is displayed on a game screen 20. The user character 22, which is a character of the user's operation target, moves through the game space based on operations by the user.

Further, as illustrated in FIG. 2, a butterfly character 24 is displayed on the game screen 20. The butterfly character 24 is displayed in association with the user character 22. The butterfly character 24, which is displayed near the user character 22, moves in association with the user character 22. The role of the butterfly character 24 is described later.

In addition, as illustrated in FIG. 2, a virtual directional pad 30 (directional buttons) is displayed on the game screen 20. The directional pad 30, which is a direction input region set in order for a direction to be input (instructed), is used by the user to perform a direction input operation. In this case, the "direction input operation" means an operation in which any one of a finite number of directions, such as four directions or eight directions, for example, is input (instructed). In the case of the example illustrated in FIG. 2, the directional pad 30 is used in order to instruct an orientation (movement direction) of the user character 22. For example, the user issues an instruction for the orientation (movement direction) of the user character 22 by moving (sliding) his or her finger across the directional pad 30 with his or her finger still touching the directional pad 30.

Figure 3:
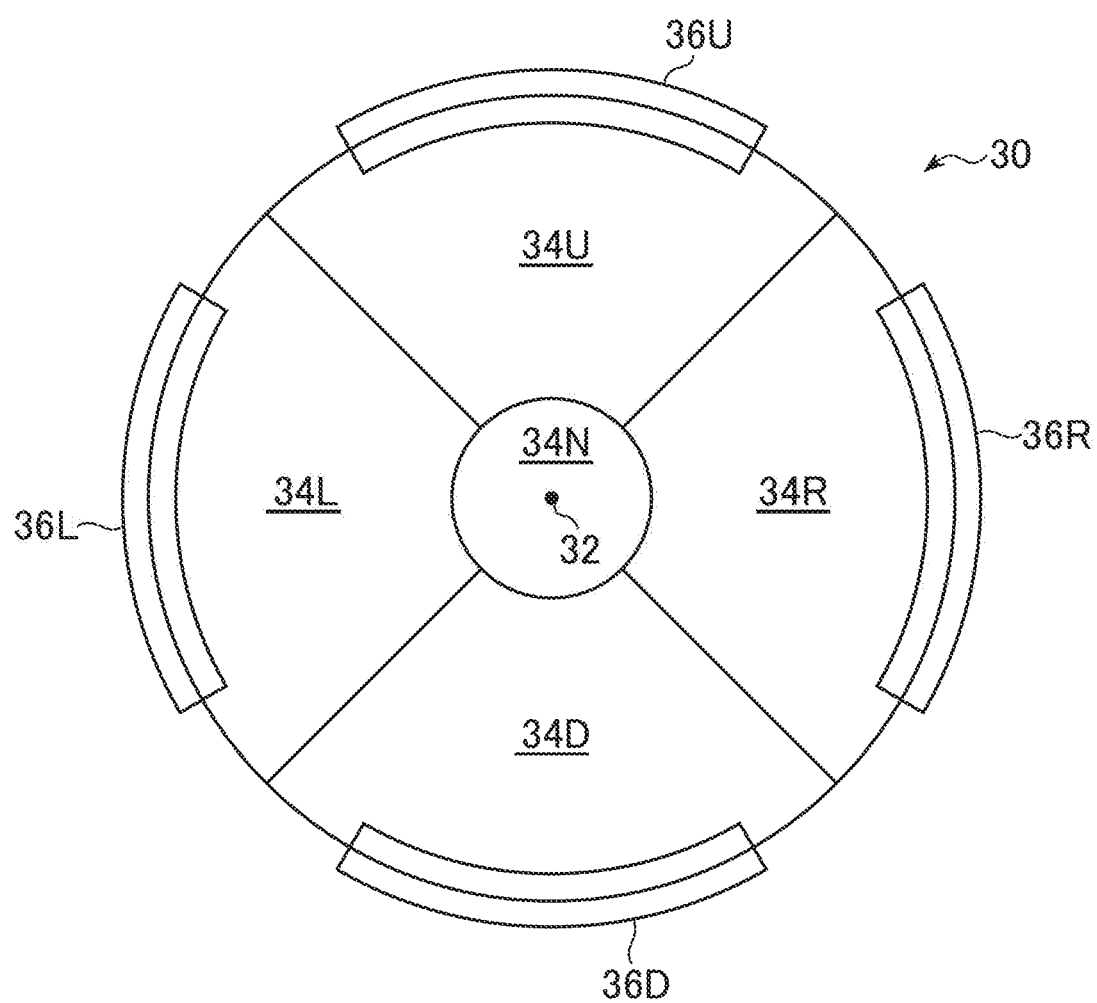
FIG. 3 is a diagram for illustrating an example of a directional pad.

FIG. 3 is a diagram for illustrating an example of the directional pad 30. In this example, there is illustrated a case in which four directions, namely, up, down, left, and right, may be input. However, the directional pad 30 may be configured so that more than four directions can be input, or so that less than four directions can be input. For example, the directional pad 30 may be configured so that eight directions, namely, up, down, left, right, up-left, up-right, down-left, and down-right, can be input.

The directional pad 30 illustrated in FIG. 3 is a circular region with a predetermined radius around a reference position 32. However, the shape of the directional pad 30 is not limited to a circular region. The directional pad 30 may be a region other than a circular region.

As illustrated in FIG. 3, four regions respectively corresponding to four directions, namely, up, down, left, and right, are set in the directional pad 30. In other words, an up region 34U corresponding to the up direction, a down region 34D corresponding to the down direction, a left region 34L corresponding to the left direction, and a right region 34R corresponding to the right direction, are set. Further, a neutral region 34N that does not correspond to any direction is also set in the directional pad 30. In FIG. 3, region boundary lines are illustrated. However, the boundary lines may or may not be displayed on the game screen 20.

The neutral region 34N is set near the reference position 32. For example, a region including the reference position 32 is set as the neutral region 34N. In the case of the example illustrated in FIG. 3, the neutral region 34N is a circular region with a predetermined radius around the reference position 32. It is to be understood that the radius of the neutral region 34N is smaller than the radius of the directional pad 30.

The up region 34U, the down region 34D, the left region 34L, and the right region 34R are set around the reference position 32. In the example illustrated in FIG. 3, those four regions are set radially around the reference position 32.

The up region 34U is positioned on an upper side of the reference position 32. The up region 34U is a region obtained by removing the neutral region 34N from a 90° fan-shaped region extending in an upward direction from the reference position 32. Similarly, the down region 34D is positioned on a lower side of the reference position 32. The down region 34D is a region obtained by removing the neutral region 34N from a 90° fan-shaped region extending in a downward direction from the reference position 32.

Further, the left region 34L is positioned on a left side of the reference position 32. The left region 34L is a region obtained by removing the neutral region 34N from a 90° fan-shaped region extending in a leftward direction from the reference position 32. Similarly, the right region 34R is positioned on a right side of the reference position 32. The right region 34R is a region obtained by removing the neutral region 34N from a 90° fan-shaped region extending in a rightward direction from the reference position 32.

The user issues an instruction for anyone of the directions among up, down, left, and right, by touching with his or her finger anyone of the up region 34U, the down region 34D, the left region 34L, and the right region 34R. When an instruction for any one of the directions has been issued by the user, game processing is executed based on the direction instructed by the user. For example, the orientation (movement direction) of the user character 22 is set based on the direction instructed by the user. For example, when the user has touched the up region 34U with his or her finger, the orientation (movement direction) of the user character 22 is set to the up direction.

Further, as illustrated in FIG. 3, the directional pad 30 includes an up image 36U corresponding to the up direction, a down image 36D corresponding to the down direction, a left image 36L corresponding to the left direction, and a right image 36R corresponding to the right direction. The up image 36U is displayed in association with the up region 34U, and the down image 36D is displayed in association with the down region 34D. Further, the left image 36L is displayed in association with the left region 34L, and the right image 36R is displayed in association with the right region 34R.

The expression "the image is displayed in association with the region" means that the image is displayed in a manner that enables the user to grasp the fact that the image and the region are associated with each other. For example, displaying the image so that at least apart of the image is superimposed over at least a part of the region, or displaying the image near the region, correspond to "the image is displayed in association with the region".

Figure 4:
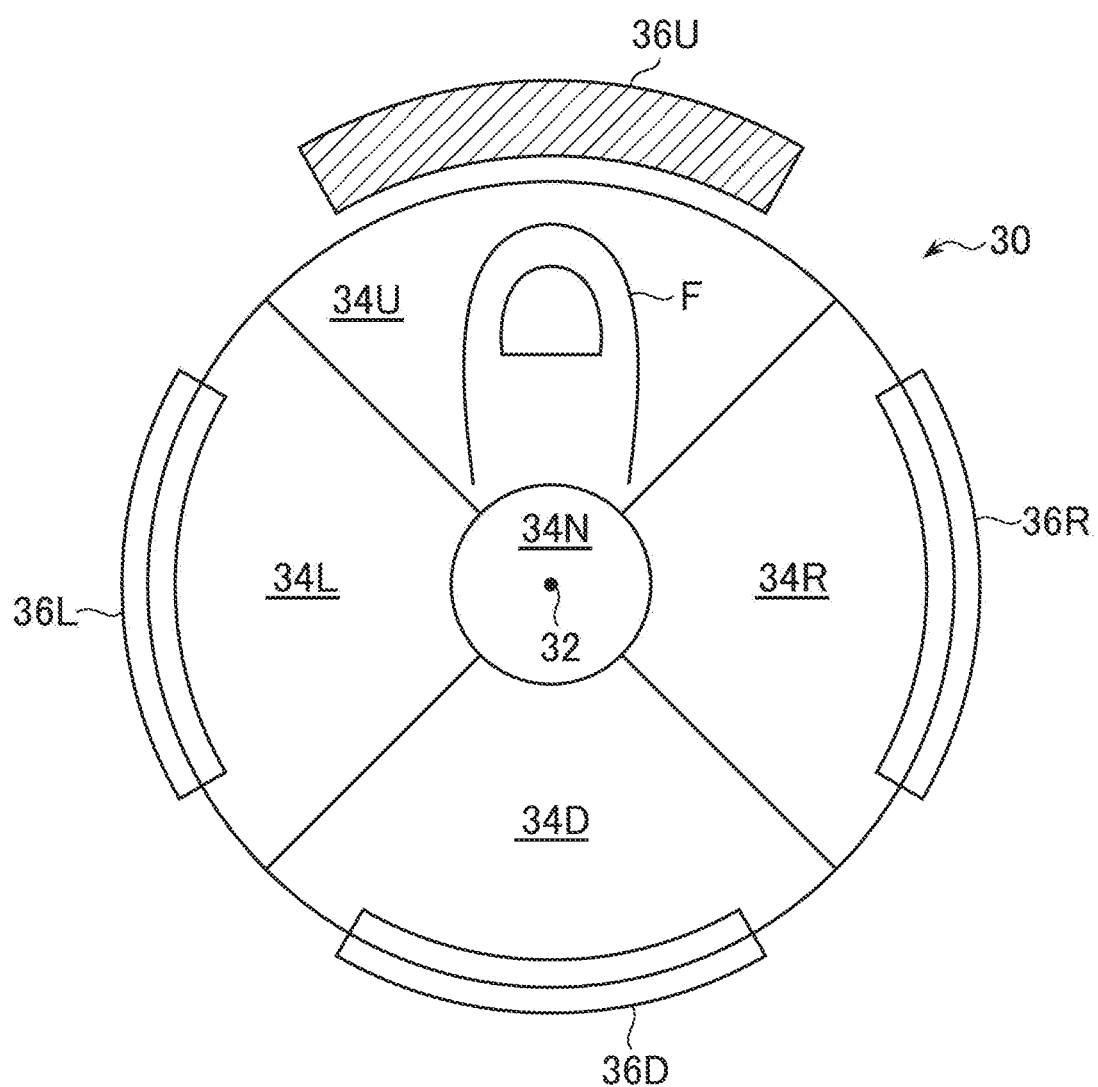
FIG. 4 is a diagram for illustrating an up image, a down image, a left image, and a right image.

The up image 36U, the down image 36D, the left image 36L, and the right image 36R fulfill a role of indicating the direction instructed by the user. FIG. 4 is a diagram for illustrating the up image 36U, the down image 36D, the left image 36L, and the right image 36R.

In FIG. 4, there is illustrated a case in which the user is touching the up region 34U with his or her finger F, that is, the user is issuing an instruction for the up direction. In this case, the up image 36U corresponding to the up region 34U is displayed in an emphasized manner. For example, the up image 36U is displayed so as to be distinguishable from the other images (down image 36D, left image 36L, and right image 36R).

For example, the color of the up image 36U is set to be different from the color of the other images. For example, the color of the up image 36U is set to be a brighter color than the color of the other images. Further, for example, the size of the up image 36U is set to be different from the size of the other images. For example, the size of the up image 36U is set to be larger than the size of the other images. In addition, for example, the up image 36U is moved in an external direction of the directional pad 30. In other words, a distance between the up image 36U and the reference position 32 is set to be larger than the distances between the other images and the reference position 32.

Therefore, when the user is touching the up region 34U in the game device 10, the up image 36U is displayed in an emphasized manner. As a result, the user may at a glance grasp the fact that the user is issuing an instruction for the up direction.

In the case described above, the position of the up image 36U is displayed at a position more toward an external side than the touch position by the user as seen from the reference position 32. With this configuration, the up image 36U is not hidden by the finger of the user, which allows the user to more easily grasp the fact that the user is issuing an instruction for the up direction.

Figure 5:
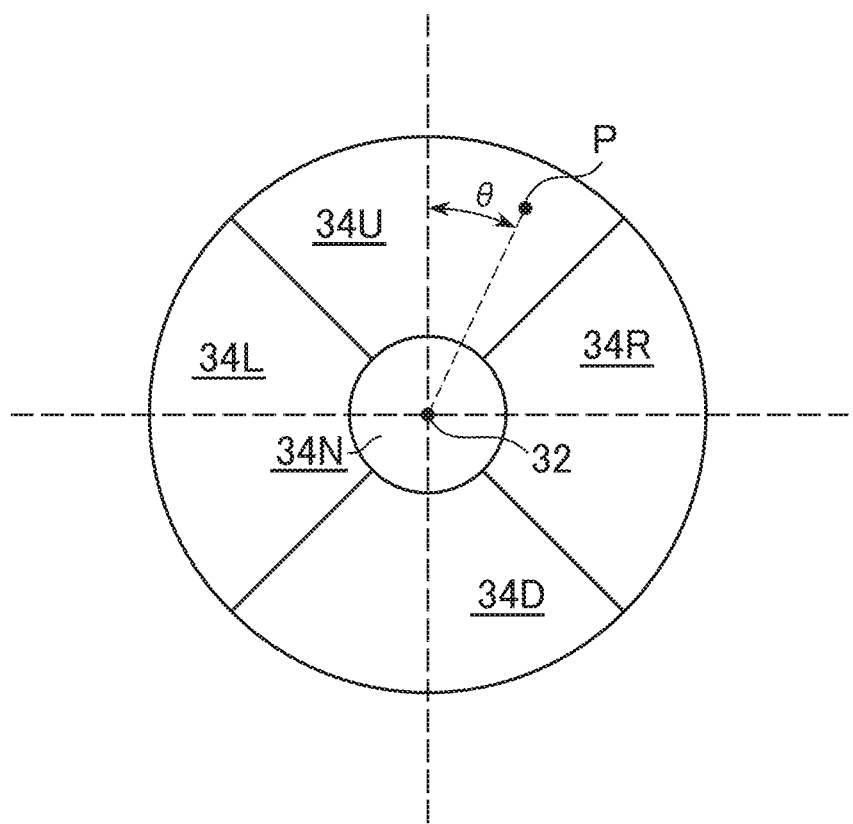
FIG. 5 is a diagram for illustrating a butterfly character.
Figure 6:
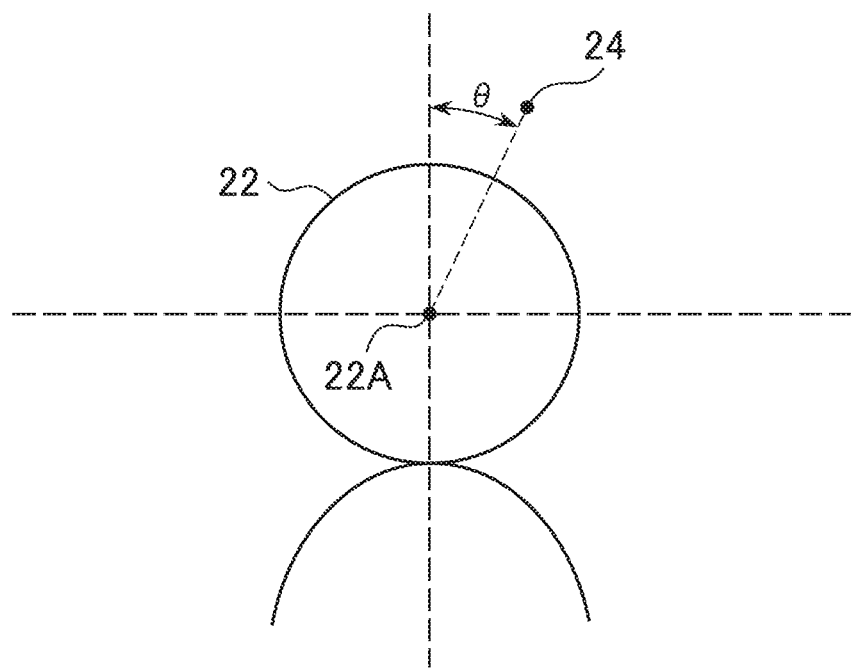
FIG. 6 is a diagram for illustrating a butterfly character.

Further, in the game device 10, the butterfly character 24 also has a role of indicating the direction instructed by the user. FIG. 5 and FIG. 6 are diagrams for illustrating the butterfly character 24. A position P illustrated in FIG. 5 represents the touch position by the user.

As illustrated in FIG. 5 and FIG. 6, the position of the butterfly character 24 is set so that a "positional relationship between the user character 22 and the butterfly character 24" corresponds to a "positional relationship between the reference position 32 of the directional pad 30 and the touch position P by the user".

For example, the position of the butterfly character 24 is set so that a "direction from a representative point 22A of the user character 22 to the butterfly character 24" corresponds to a "direction from the reference position 32 of the directional pad 30 to the touch position P by the user".

The position of the butterfly character 24 may be set so that a "distance from a representative point 22A of the user character 22 to the butterfly character 24" corresponds to a "distance from the reference position 32 of the directional pad 30 to the touch position P by the user". Further, in the example illustrated in FIG. 6, the center of a head portion (face) is set as the representative point 22A of the user character 22. However, for example, the center of a trunk portion (e.g., chest portion, stomach portion, etc.) may be set as the representative point 22A.

Setting the position of the butterfly character 24 in the manner described above enables the user to grasp the position in the directional pad 30 that the user is touching based on the positional relationship between the user character 22 and the butterfly character 24. Usually, the user plays the game while focusing on the user character 22. However, using the above-mentioned butterfly character 24 enables the user to grasp the position in the directional pad 30 that the user is touching while focusing on the user character 22.

In the case described above, the butterfly character 24 is displayed. However, it is to be understood that a character other than the butterfly character 24 may be displayed. Further, an image other than a character (e.g., mark, cursor, icon, etc.) may also be displayed.

In a related-art game device, when the user has operated the virtual directional pad in order to change the input direction, it may be difficult for the user to grasp whether or not the input direction has actually been changed by that operation, leading to a difficulty in performing the direction input operation. In contrast, with the game device 10, when the user has operated the directional pad 30 in order to change the input direction, it is easy for the user to grasp whether or not the input direction has actually been changed by that operation.

In other words, in the game device 10, the touch panel 14T is configured to vibrate when the region touched by the user has changed among the up region 34U, the down region 34D, the left region 34L, and the right region 34R. Specifically, the touch panel 14T is configured to vibrate when the region touched by the user has changed from one region to another region among the up region 34U, the down region 34D, the left region 34L, and the right region 34R. As a result, the user can grasp the fact that the input direction has changed.

The touch panel 14T is also configured to vibrate when the region touched by the user has changed from the neutral region 34N to any one of the up region 34U, the down region 34D, the left region 34L, and the right region 34R. However, the touch panel 14T is configured to not vibrate when the region touched by the user has changed from any one of the up region 34U, the down region 34D, the left region 34L, and the right region 34R, to the neutral region 34N.

Figure 7:
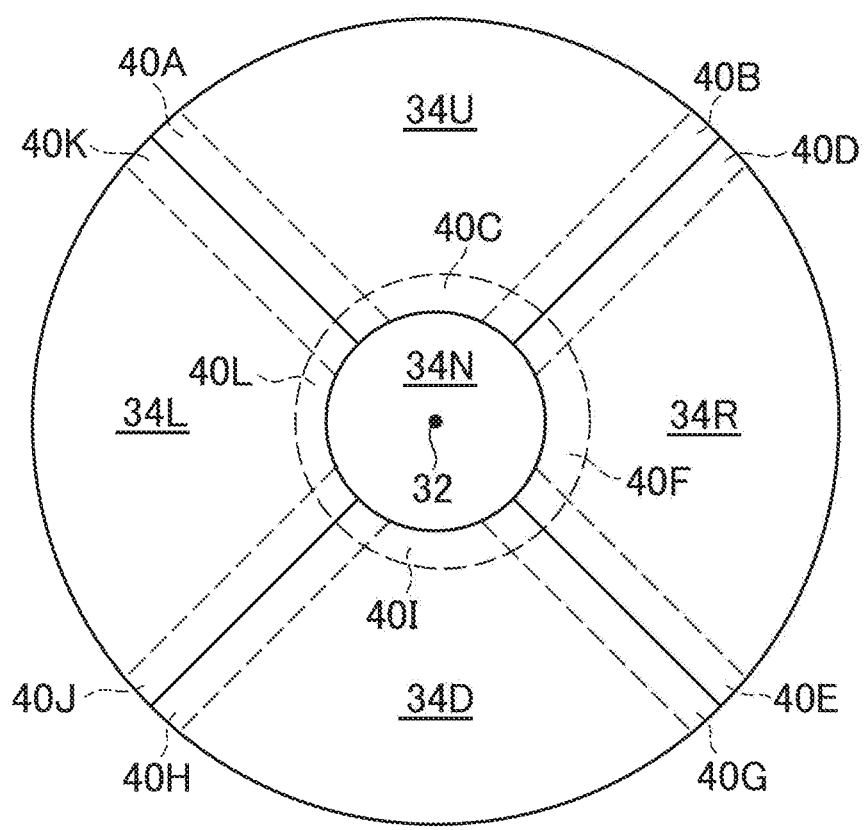
FIG. 7 is a diagram for illustrating an example of a vibration delay region.

In the case that the touch position by the user has changed near a region boundary, when vibrations are generated each time the touch position crosses the boundary line, vibrations may be continuously generated more than is necessary. Regarding this point, in the game device 10, a region in which vibration generation is delayed (hereinafter referred to as "vibration delay region") is set near the boundary. FIG. 7 is a diagram for illustrating an example of the vibration delay region.

As illustrated in FIG. 7, the up region 34U includes vibration delay regions 40A, 40B, and 40C. The vibration delay region 40A is set near the boundary between the up region 34U and the left region 34L. The vibration delay region 40A is set based on the boundary line between the up region 34U and the left region 34L. For example, a region that is in the up region 34U, and includes the above-mentioned boundary line, may be set as the vibration delay region 40A. Further, for example, a region that is in the up region 34U, and is adjacent to the above-mentioned boundary line, may be set as the vibration delay region 40A. In addition, for example, a region that is in the up region 34U, and is within a predetermined distance from the above-mentioned boundary line, may be set as the vibration delay region 40A.

Further, the vibration delay region 40B is set near the boundary between the up region 34U and the right region 34R. The vibration delay region 40B is set based on the boundary line between the up region 34U and the right region 34R. For example, a region that is in the up region 34U, and includes the above-mentioned boundary line, may be set as the vibration delay region 40B. Further, for example, a region that is in the up region 34U, and is adjacent to the above-mentioned boundary line, may be set as the vibration delay region 40B. In addition, for example, a region that is in the up region 34U, and is within a predetermined distance from the above-mentioned boundary line, may be set as the vibration delay region 40B.

The vibration delay region 40C is set near the boundary between the up region 34U and the neutral region 34N. The vibration delay region 40C is set based on the boundary line between the up region 34U and the neutral region 34N. For example, a region that is in the up region 34U, and includes the above-mentioned boundary line, may be set as the vibration delay region 40C. Further, for example, a region that is in the up region 34U, and is adjacent to the above-mentioned boundary line, may be set as the vibration delay region 40C. In addition, for example, a region that is in the up region 34U, and is within a predetermined distance from the above-mentioned boundary line, may be set as the vibration delay region 40C.

Similarly, the right region 34R includes vibration delay regions 40D, 40E, and 40F, the down region 34D includes vibration delay regions 40G, 40H, and 40I, and the left region 34L includes vibration delay regions 40J, 40K, and 40L. In the following description, the vibration delay regions 40A to 40L are sometimes collectively referred to as "vibration delay region 40".

Figure 8:
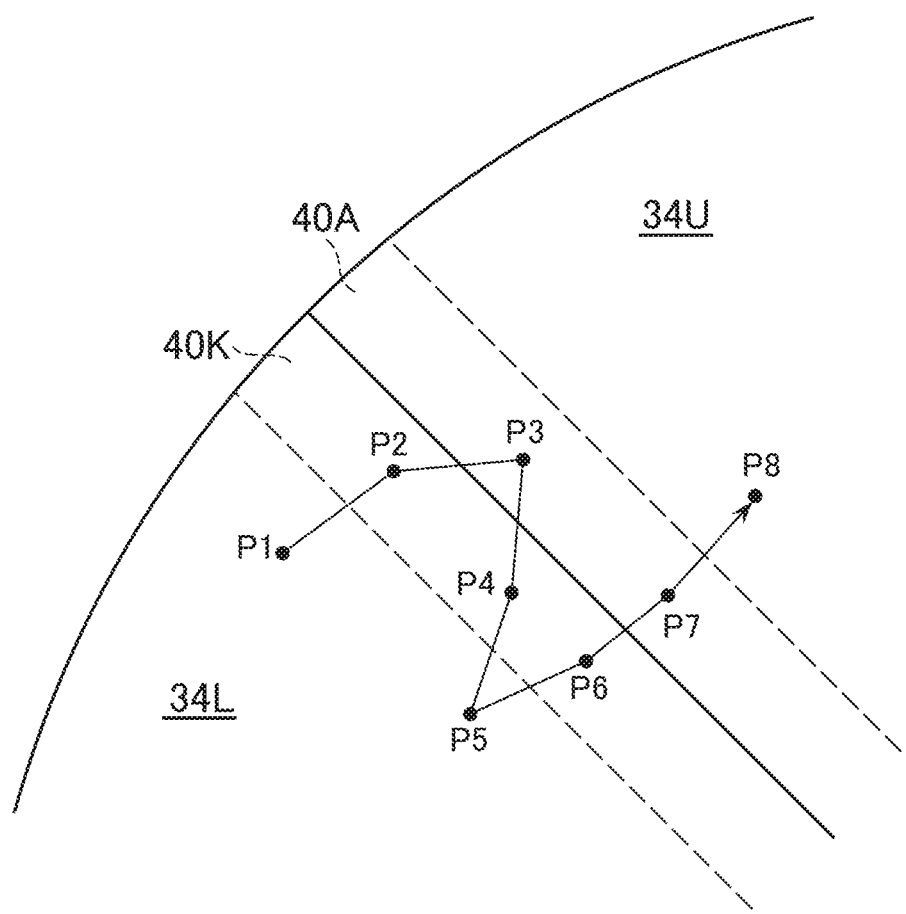
FIG. 8 is a diagram for illustrating vibration delay.

In FIG. 8, which is a diagram for illustrating vibration delay, an example of changes in the touch position by the user is illustrated. In FIG. 8, there is illustrated a case in which the touch position by the user has changed in order of positions P1, P2, P3, P4, P5, P6, P7, and P8. In the example illustrated in FIG. 8, the touch position by the user changes near the boundary between the left region 34L and the up region 34U.

In the example illustrated in FIG. 8, when the touch position by the user has changed from the position P2 to the position P3, the touch position by the user changes from the left region 34L to the up region 34U. However, in this case, the touch position (position P3) by the user is included in the vibration delay region 40A, and hence vibrations are not generated at this stage.

Further, in the example illustrated in FIG. 8, after the touch position by the user has changed from the left region 34L (position P2) to the up region 34U (position P3), the touch position by the user returns to the left region 34L (positions P4 and P5). However, in this case, because the touch position by the user is returning from the up region 34U to the left region 34L without vibrations being generated when the touch position by the user changed from the left region 34L to the up region 34U, vibrations are not generated.

In addition, in the example illustrated in FIG. 8, after the touch position by the user has returned to the left region 34L, the touch position by the user changes from the left region 34L (positions P4, P5, and P6) to the up region 34U (position P7). However, similar to the case described above, because the touch position (position P7) by the user is included in the vibration delay region 40A, vibrations are not generated at this stage.

Still further, in the example illustrated in FIG. 8, after the touch position by the user has changed to the position P7 in the up region 34U, the touch position by the user in the up region 34U changes from the position P7 to the position P8. At this time, the touch position by the user changes from being in the vibration delay region 40A to being outside the vibration delay region 40A. The game device 10 is configured to generate vibrations at this stage.

For example, if vibrations are generated when the touch position by the user has changed from the position P2 to the position P3, or when the touch position by the user has changed from the position P3 to the position P4, or when the touch position by the user has changed from the position P6 to the position P7, vibrations are continuously generated more than is necessary, which may cause the user to become confused. Regarding this point, the game device 10 is configured so that such a problem does not occur.

Figure 9:
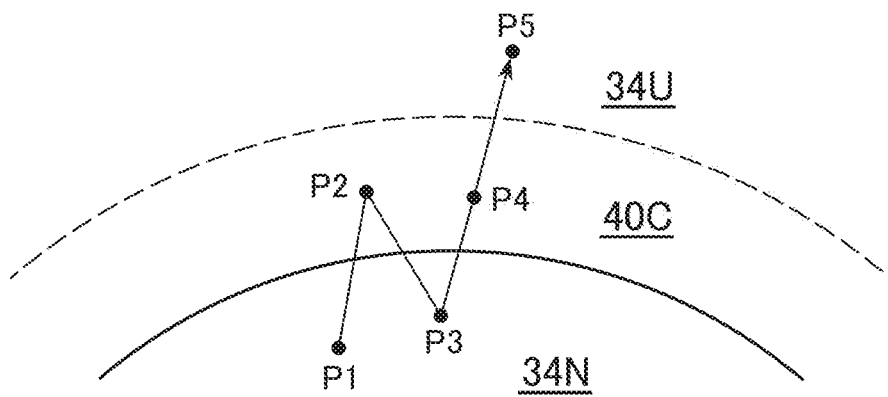
FIG. 9 is a diagram for illustrating vibration delay.

In FIG. 9, which is a diagram for illustrating vibration delay, an example of changes in the touch position by the user is illustrated. In FIG. 9, there is illustrated a case in which the touch position by the user has changed in order of positions P1, P2, P3, P4, and P5. In the example illustrated in FIG. 9, the touch position by the user changes near the boundary between the neutral region 34N and the up region 34U.

In the example illustrated in FIG. 9, when the touch position by the user has changed from the position P1 to the position P2, the touch position by the user changes from the neutral region 34N to the up region 34U. However, in this case, the touch position (position P2) by the user is included in the vibration delay region 40C, and hence vibrations are not generated at this stage.

Further, in the example illustrated in FIG. 9, after the touch position by the user has changed from the neutral region 34N (position P1) to the up region 34U (position P2), the touch position by the user returns to the neutral region 34N (position P3). As described above, vibrations are not generated in a case in which the touch position by the user has changed from the up region 34U to the neutral region 34N.

In addition, in the example illustrated in FIG. 9, after the touch position by the user has returned to the neutral region 34N (position P3), the touch position by the user changes from the neutral region 34N (position P3) to the up region 34U (position P4). However, similar to the case described above, because the touch position (position P4) by the user is included in the vibration delay region 40C, vibrations are not generated at this stage.

Still further, in the example illustrated in FIG. 9, after the touch position by the user has changed to the position P4 in the up region 34U, the touch position by the user in the up region 34U changes from the position P4 to the position P5. At this time, the touch position by the user changes from being in the vibration delay region 40C to being outside the vibration delay region 40C. The game device 10 is configured to generate vibrations at this stage.

For example, if vibrations are generated when the touch position by the user has changed from the position P1 to the position P2, or when the touch position by the user has changed from the position P3 to the position P4, vibrations are continuously generated more than is necessary, which may cause the user to become confused. Regarding this point, the game device 10 is configured so that such a problem does not occur.

Figure 10:
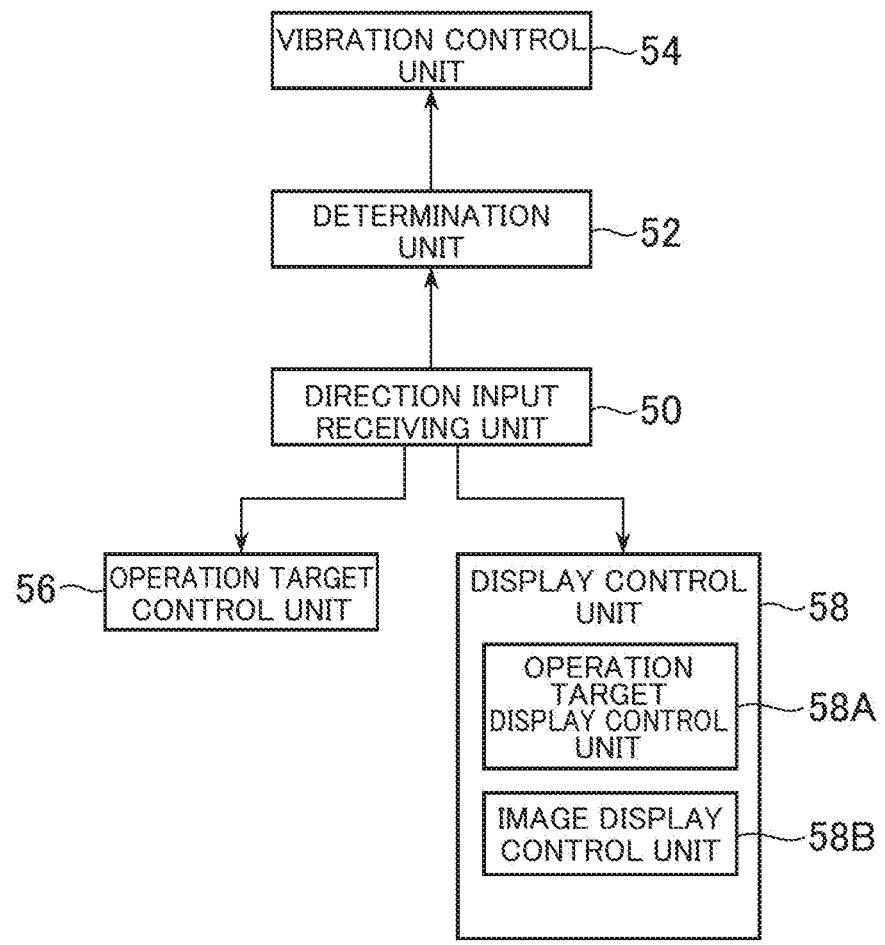
FIG. 10 is a function block diagram of the game device.

Next, a configuration for implementing functions such as those described above is described. FIG. 10 is a function block diagram for illustrating function blocks implemented by the game device 10. As illustrated in FIG. 10, the game device 10 includes a direction input receiving unit 50, a determination unit 52, a vibration control unit 54, an operation target control unit 56, and a display control unit 58. Those function blocks are implemented by, for example, the control unit 11 of the game device 10. In other words, the control unit 11 is configured to function as the above-mentioned function blocks by executing processing based on a program.

The direction input receiving unit 50 is configured to receive direction input by determining which region, among a plurality of regions set so as to correspond to each of a plurality of directions, a touch position detected by the touch panel 14T is included in. As described above, "direction input operation" as used here means an operation in which any one of a finite number of directions, such as four directions or eight directions, for example, is input.

The determination unit 52 is configured to determine whether or not the touch position has changed from being in one region to being in another region among the plurality of regions. The vibration control unit 54 is configured to execute, when the touch position has changed from being in one region to being in another region, control for causing the touch panel 14T to vibrate.

For example, the plurality of regions include a first region, and a second region adjacent to the first region, and the second region includes a third region set near a boundary with the first region. In this case, for example, the third region is a region that is in the second region, and includes the boundary with the first region. Further, for example, the third region is a region that is in the second region, and is adjacent to the boundary with the first region. For example, the third region is a region that is in the second region, and is a predetermined distance or less from the boundary with the first region. For example, the vibration control unit 54 is configured to delay, when the touch position has changed from being in the first region to being in the second region, the touch panel 14T from being caused to vibrate until the touch position is in a state of being included in a region other than the third region in the second region.

Further, for example, the above-mentioned plurality of regions are set around a reference position, and each of the plurality of regions includes a fourth region set near the reference position. In this case, for example, the fourth region is a region that is a predetermined distance or less from the reference position. For example, the vibration control unit 54 is configured to delay, when the touch position has changed to being in one region among the above-mentioned plurality of regions, the touch panel 14T from being caused to vibrate until the touch position is in a state of being included in a region other than the fourth region in the relevant one region.

In the case of the example described with reference to FIG. 2 to FIG. 9, the up region 34U, the down region 34D, the left region 34L, and the right region 34R correspond to an example of the "plurality of regions". For example, each of the vibration delay regions 40A, 40B, 40D, 40E, 40G, 40H, 40J, and 40K corresponds to an example of the "third region". For example, when the left region 34L corresponds to the "first region" and the up region 34U corresponds to the "second region", the vibration delay region 40A corresponds to the "third region". Further, for example, when the up region 34U corresponds to the "first region" and the left region 34L corresponds to the "second region", the vibration delay region 40K corresponds to the "third region". In addition, each of the vibration delay regions 40C, 40F, 40I, and 40L corresponds to an example of the "fourth region".

In the case of the example described with reference to FIG. 2 to FIG. 9, the direction input receiving unit 50 is configured to determine the direction instructed by the user by determining which region, among the up region 34U, the down region 34D, the left region 34L, and the right region 34R, the touch position detected by the touch panel 14T is included in.

The determination unit 52 is configured to determine whether or not the touch position has changed from being in one region to being in another region among the up region 34U, the down region 34D, the left region 34L, and the right region 34R. The vibration control unit 54 is configured to generate, when it is determined that the touch position has changed from being in one region to being in another region among the up region 34U, the down region 34D, the left region 34L, and the right region 34R, vibrations by controlling the vibration unit 15.

Further, for example, the vibration control unit 54 is configured to delay, when the touch position has changed from being in the left region 34L to being in the up region 34U, until the touch position is in a state of being included in a region other than the vibration delay region 40A (i.e., vibration delay region 40 that is set in the up region 34U, and is near the boundary between the left region 34L and the up region 34U), the touch panel 14T from being caused to vibrate. In other words, the vibration control unit 54 is configured to suppress the vibrating of the touch panel 14T during the period in which the touch position is included in the vibration delay region 40A.

In addition, for example, the vibration control unit 54 is configured to delay, when the touch position has changed from being in the neutral region 34N to being in the up region 34U, until the touch position is in a state of being included in a region other than the vibration delay region 40C (i.e., vibration delay region 40 that is set in the up region 34U, and, is near the boundary between the neutral region 34N and the up region 34U), the touch panel 14T from being caused to vibrate. In other words, the vibration control unit 54 is configured to suppress the vibrating of the touch panel 14T during the period in which the touch position is included in the vibration delay region 40C.

The operation target control unit 56 is configured to set the orientation of the user's operation target so that the user's operation target faces the direction corresponding to, among the plurality of regions set so as to correspond to each of a plurality of directions, the region in which the touch position is included.

In the case of the example described with reference to FIG. 2 to FIG. 9, the user character 22 corresponds to an example of the "user's operation target". In other words, the operation target control unit 56 is configured to set the orientation of the user character 22 so that the user character 22 faces the direction corresponding to, among the up region 34U, the down region 34D, the left region 34L, and the right region 34R, the region in which the touch position is included. For example, when the touch position is included in the up region 34U, the operation target control unit 56 sets the orientation of the user character 22 to the up direction.

The display control unit 58 is configured to execute control causing the game screen 20 to be displayed on the display unit 16. For example, the display control unit 58 includes an operation target display control unit 58A and an image display control unit 58B. The operation target display control unit 58A is configured to execute control for causing the user's operation target, and a display target to be displayed in association with the user's operation target, to be displayed on the display unit 16.

In this case, the "display target to be displayed in association with the user's operation target" means that a display target is displayed so that the user can recognize the fact that the user's operation target and the display target are associated with each other. The position of the display target is set, for example, based on the position of the user's operation target. The display target is, for example, displayed near the user's operation target, and moved in association with the user's operation target.

For example, in the case of the example described with reference to FIG. 2 to FIG. 9, the user character 22 corresponds to an example of the "user's operation target", and the butterfly character 24 corresponds to an example of the "display target".

The operation target display control unit 58A is configured to set the position of the butterfly character 24 based on the position of the user character 22. For example, the operation target display control unit 58A is configured to set the position of the butterfly character 24 so that the distance from the user character 22 to the butterfly character 24 is a predetermined distance. Further, for example, the operation target display control unit 58A is configured to set the position of the butterfly character 24 so that the direction from the user character 22 to the butterfly character 24 corresponds to the direction from the reference position 32 of the directional pad 30 to the touch position by the user.

The image display control unit 58B is configured to execute control for displaying on the display unit 16 an image indicating, among the plurality of regions set so as to correspond to each of a plurality of directions, the direction corresponding to the region in which the touch position detected by the touch panel 14T is included.

For example, in the case of the example described with reference to FIG. 2 to FIG. 9, the up region 34U, the down region 34D, the left region 34L, and the right region 34R correspond to an example of the "plurality of regions", and the image that is emphasized among the up image 36U, the down image 36D, the left image 36L, and the right image 36R corresponds to an example of the "image".

For example, as illustrated in FIG. 4, the image display control unit 58B is configured to display, when the touch position by the user is included in the up region 34U, the up image 36U in an emphasized manner. In other words, the image display control unit 58B is configured to distinguishably display the up image 36U by differentiating the display mode (e.g., color, size, shape, distance from the reference position 32 etc.) of the up image 36U from the display mode of the other images (down image 36D, left image 36L, and right image 36R).

Further, the image display control unit 58B is configured to display, when the touch position by the user is included in the down region 34D, the down image 36D in an emphasized manner. In addition, the image display control unit 58B is configured to display, when the touch position by the user is included in the left region 34L or the right region 34R, the left image 36L or the right image 36R in an emphasized manner.

Further, for example, as illustrated in FIG. 4, the image display control unit 58B is configured to display, when the touch position by the user is included in the up region 34U, the up image 36U at a position more toward an external side than the touch position by the user as seen from the reference position 32 of the directional pad 30. In other words, the image display control unit 58B is configured to set the position of the up image 36U so that the distance between the reference position 32 of the directional pad 30 and the up image 36U is longer than the distance between the reference position 32 and the touch position by the user. For example, the image display control unit 58B is configured to set the position of the up image 36U so that the distance from the touch position by the user to the up image 36U is a predetermined distance or more.

In addition, the image display control unit 58B is configured to set, when the touch position by the user is included in the down region 34D, the position of the down image 36D in the same manner. Still further, the image display control unit 58B is configured to display, when the touch position by the user is included in the left region 34L or the right region 34R, the position of the left image 36L or the position of the right image 36R in the same manner.

Figure 12:
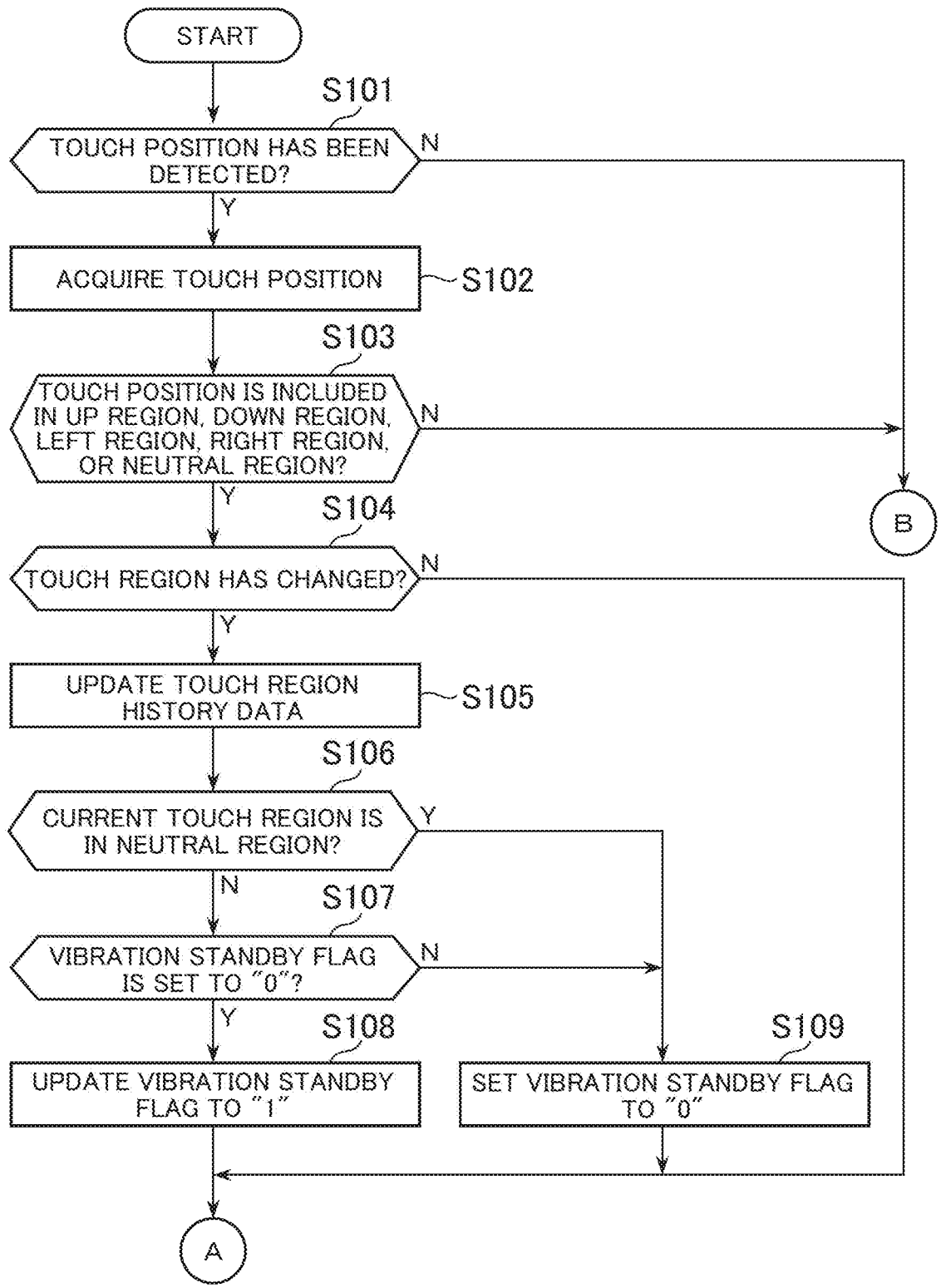
FIG. 12 is a flow chart for illustrating an example of processing executed by the game device.
Figure 13:
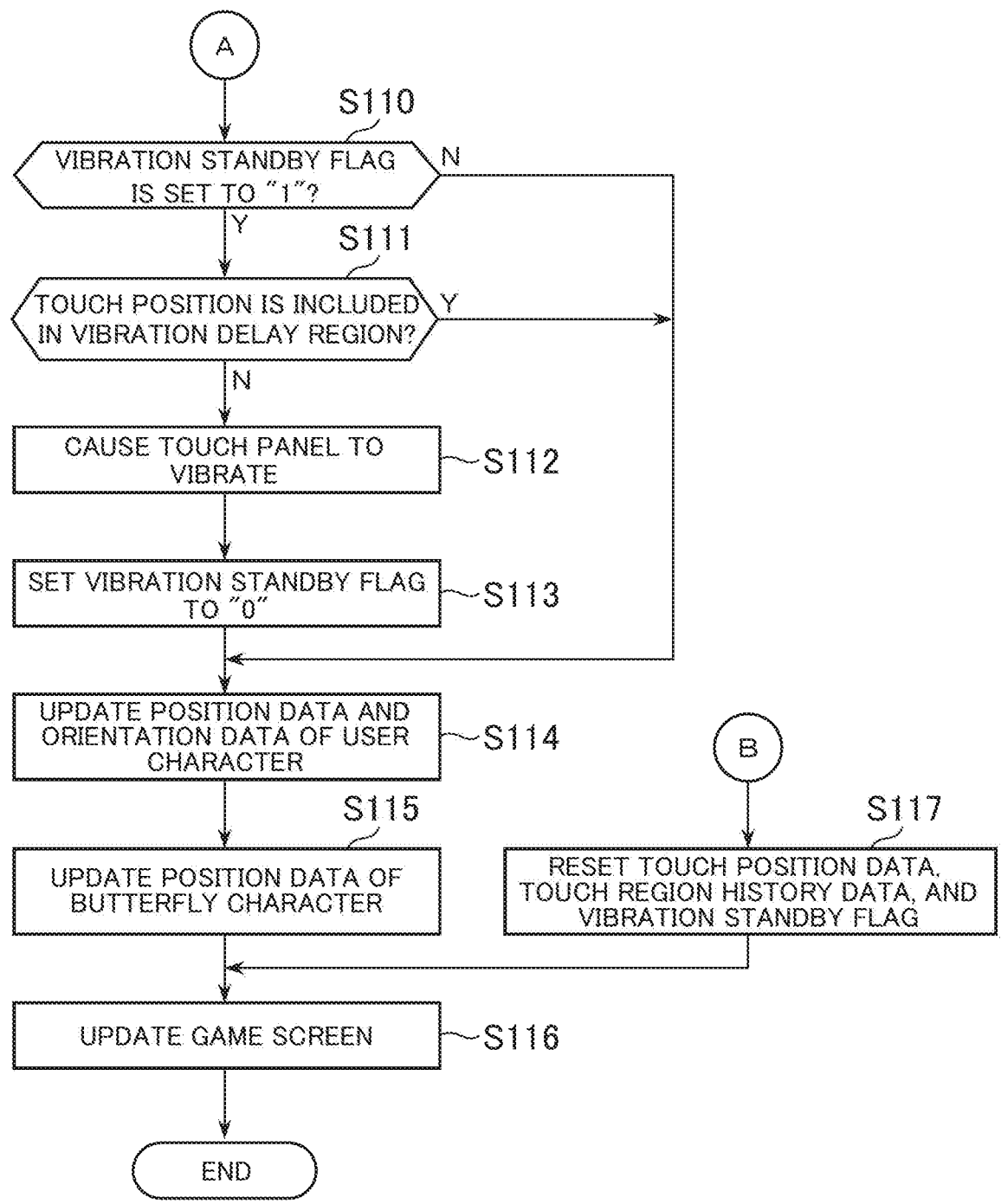
FIG. 13 is a flow chart for illustrating an example of processing executed by the game device.

Next, processing executed by the game device 10 is described. In FIG. 11, an example of data stored in the storage unit 12 is shown. In FIG. 12 and FIG. 13, an example of processing executed by the game device 10 every predetermined time interval (e.g., 1/60 of a second) is illustrated.

The data shown in FIG. 11, which is data indicating a current situation of the game, is the data necessary in order to execute the processing illustrated in FIG. 12 and FIG. 13. In addition to the data shown in FIG. 11, for example, data for specifying the reference position 32 of the directional pad 30, the up region 34U, the down region 34D, the left region 34L, the right region 34R, the neutral region 34N, and the like, is stored in the storage unit 12.

The data shown in FIG. 11 includes, for example, touch position data. The touch position data includes the current touch position by the user. In other words, the touch position data indicates the newest touch position detected by the touch panel 14T.

Further, the data shown in FIG. 11 includes touch region history data. The history data indicates the history of changes in the touch region by the user. In this case, the region touched by the user among the up region 34U, the down region 34D, the left region 34L, the right region 34R, and the neutral region 34N (i.e., the region in which the touch position by the user is included) is described as "touch region".

In the data shown in FIG. 11, the current touch region (i.e., the region that the user is currently touching) and the previous touch region (i.e., the region that the user touched one region before) are stored. The example shown in FIG. 11 represents a case in which the region the user is currently touching is the up region 34U, and the region the user touched one region before is the left region 34L.

The data shown in FIG. 11 also includes a vibration standby flag. The vibration standby flag indicates whether or not the game device is standing by for vibration generation. For example, a value of "0" or a "1" is set as the vibration standby flag. When the value "0" is set as the vibration standby flag (i.e., when the vibration standby flag is not set), this corresponds to a state in which the game device is standing by for vibration generation. On the other hand, when the value "1" is set as the vibration standby flag (i.e., when the vibration standby flag is set), this corresponds to a state in which the game device is standing by for vibration generation.

Further, the data shown in FIG. 11 includes position data and orientation data of the user character 22. Those pieces of data indicate the current position and orientation of the user character 22. In addition, the data shown in FIG. 11 includes position data of the butterfly character 24. The position data indicates the current position of the butterfly character 24.

As illustrated in FIG. 12, first, the control unit 11 determines whether or not the touch position has been detected by the touch panel 14T (S101). When the touch position has been detected by the touch panel 14T, the control unit 11 acquires the touch position (S102). In this case, the control unit 11 updates the touch position data.

Then, the control unit 11 determines whether or not the touch position acquired in Step S102 is included in any one of the up region 34U, the down region 34D, the left region 34L, the right region 34R, and the neutral region 34N (S103).

When the touch position acquired in Step S102 is included in any one of the up region 34U, the down region 34D, the left region 34L, the right region 34R, and the neutral region 34N, the control unit 11 determines whether or not the touch region by the user has changed (S104). In other words, the control unit 11 determines whether or not the current touch region indicated by the touch region history data and the region in which the touch position acquired in Step S102 is included are different.

When the touch region by the user has changed, the control unit 11 updates the touch region history data (S105). Then, the control unit 11 determines whether or not the current touch region is the neutral region 34N (S106). When the current touch region is the neutral region 34N, the control unit 11 sets the vibration standby flag to "0" (S109). In this embodiment, processing such as this is performed because vibrations are not generated when the touch region by the user has changed from any one of the up region 34U, the down region 34D, the left region 34L, and the right region 34R to the neutral region 34N.

On the other hand, when the current touch region is not the neutral region 34N, namely, when the current touch region is the up region 34U, the down region 34D, the left region 34L, or the right region 34R, the control unit 11 determines whether or not the vibration standby flag is set to "0" (S107). When the vibration standby flag is set to "0", the control unit 11 updates the vibration standby flag to "1" (S108).

On the other hand, when it is determined in Step S107 that the vibration standby flag is not set to "0", namely, when it is determined that the vibration standby flag is set to "1", this means that after the touch position by the user changed from the first region to the second region, the touch position by the user returned from the second region to the first region without leaving the vibration delay region 40 in the second region (vibration delay region 40 set near the boundary between the first region and the second region). For example, in the example illustrated in FIG. 8, this is a case in which the touch position by the user changed from the position P3 to the position P4, or in the example illustrated in FIG. 9, a case in which the touch position by the user changed from the position P2 to the position P3. In such a case, the control unit 11 resets the vibration standby flag to "0" (S109).

After Step S108 or Step S109 has been executed, as illustrated in FIG. 13, the control unit 11 determines whether or not the vibration standby flag is set to "1" (S110).

When the vibration standby flag is set to "1", the control unit 11 determines whether or not the touch position acquired in Step S102 is the vibration delay region 40 set in the current touch region, and is included in the vibration delay region 40 set near the boundary between the current touch region and the previous touch region (S111). For example, when the current touch region is the up region 34U, and the previous touch region is the left region 34L, the control unit 11 determines whether or not the touch position acquired in Step S102 is included in the vibration delay region 40A.

Examples of cases in which the touch position acquired in Step S102 is included in the vibration delay region 40 include when the touch position acquired in Step S102 is the position P3 or the position P7 illustrated in FIG. 8, and when the touch position acquired in Step S102 is the position P2 or the position P4 illustrated in FIG. 9. In such a case, the control unit 11 executes Step S114 without executing Step S112 or Step S113, which are described below. In this case, vibrating of the touch panel 14T is delayed.

On the other hand, examples of cases in which the touch position acquired in Step S102 is not included in the vibration delay region 40 include when the touch position acquired in Step S102 is the position P8 illustrated in FIG. 8, and when the touch position acquired in Step S102 is the position P5 illustrated in FIG. 9. In such a case, the control unit 11 causes the touch panel 14T to vibrate by driving the vibration unit 15 (S112). Then, the control unit 11 resets the vibration standby flag to "0" (S113).

Next, the control unit 11 updates the position data and the orientation data of the user character 22 (S114). For example, the control unit 11 sets the orientation of the user character 22 so that the user character 22 faces the direction corresponding to the current touch region. Further, the control unit 11 updates the position of the user character 22 so that the user character 22 is moving in the direction that the user character 22 is facing.

Then, the control unit 11 updates the position data of the butterfly character 24 (S115). For example, the control unit 11 sets the position of the butterfly character 24 so that the "direction from the representative point 22A of the user character 22 to the butterfly character 24" corresponds to the "direction from the reference position 32 of the directional pad 30 to the touch position acquired in Step S102". In addition, the control unit 11 updates the game screen 20 based on the data shown in FIG. 11 (S116).

When it is determined in Step S101 that the touch position has not been detected by the touch panel 14T, the control unit 11 resets the touch position data, the touch region history data, and the vibration standby flag (S117). In this case, the touch position data indicates that the touch position has not been detected. Further, the touch region history is deleted, and the vibration standby flag is set to "0". Then, the game screen 20 is updated (S116).

In addition, the control unit 11 also resets the touch position data, the touch region history data, and the vibration standby flag (S117) when it is determined in Step S103 that the touch position is not included in any of the up region 34U, the down region 34D, the left region 34L, the right region 34R, or the neutral region 34N. Then, the game screen 20 is updated (S116).

The game device 10 described above is configured to generate vibrations when the direction being input by the user has changed. As a result, with the game device 10, when the user has performed an operation in order to change the input direction, the user can grasp whether or not the input direction has actually been changed by that operation.

Further, the game device 10 is configured so that the vibration delay region 40 is set. As a result, with the game device 10, even when the touch position by the user has changed near a region boundary, vibrations can be prevented from being continuously generated more than is necessary.

In addition, the game device 10 is configured to display in an emphasized manner the image corresponding to the region in which the touch position by the user is included among the up image 36U, the down image 36D, the left image 36L, and the right image 36R. With the game device 10, the direction being input by the user can be more easily grasped by the user.

Still further, with the game device 10, as a result of the butterfly character 24 being displayed, the user can more easily grasp the position in the directional pad 30 that the user is touching.

The present invention is not limited to the embodiment described above.

Modified Example 1

In the embodiment described above, the up region 34U, the down region 34D, the left region 34L, and the right region 34R are fixed. However, the up region 34U, the down region 34D, the left region 34L, and the right region 34R may be changed.

Figure 14:
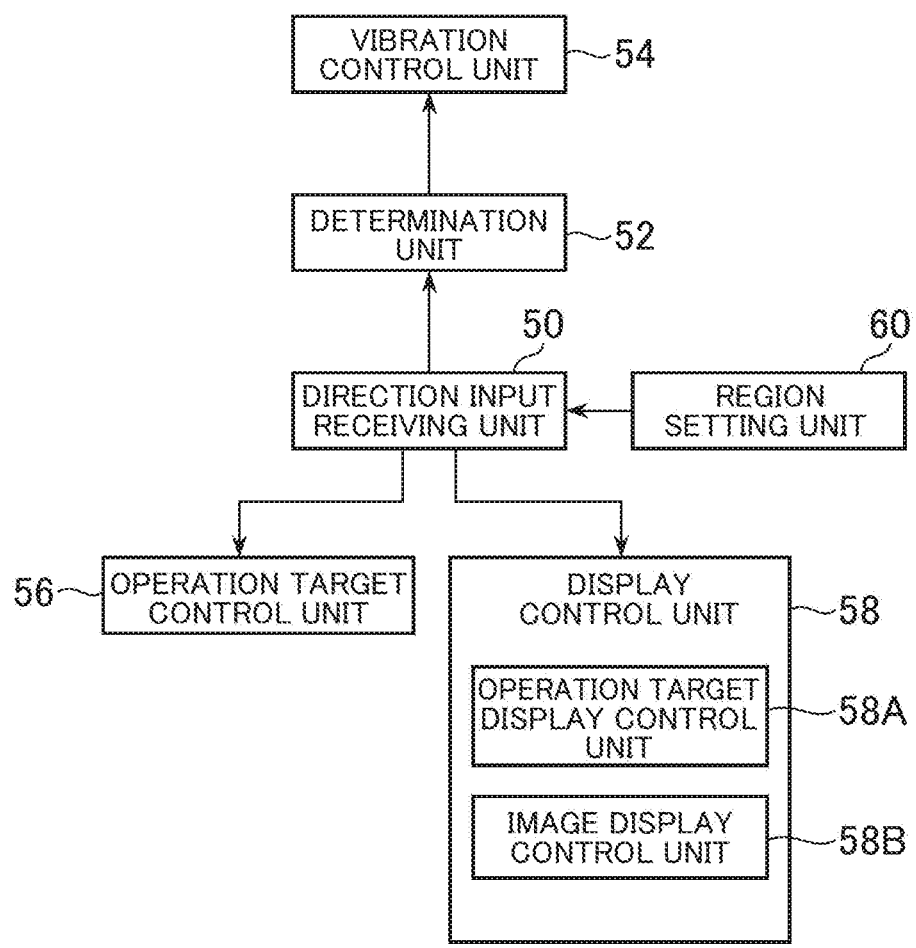
FIG. 14 is a function block diagram of the game device.

In FIG. 14, a function block diagram for such a case is illustrated. The block function diagram illustrated in FIG. 14 is different from FIG. 10 in that the game device 10 includes a region setting unit 60. Similar to the other function blocks, the region setting unit 60 is also implemented by the control unit 11. The function blocks other than the region setting unit 60 are the same as those illustrated in FIG. 10, and hence in the following description, only the region setting unit 60 is described.

Modified Example 1-1

For example, in the embodiment described above, the vibration delay region 40 is set in order to prevent vibrations from being continuously generated more than is necessary even when the touch position by the user has changed near a region boundary. However, instead of setting the vibration delay region 40, the boundaries of the up region 34U, the down region 34D, the left region 34L, and the right region 34R may be changed.

In this case, the region setting unit 60 is configured to change, when the touch position has changed from being in the first region to being in the second region (region adjacent to the first region) among the up region 34U, the down region 34D, the left region 34L, and the right region 34R, the boundary between the first region and the second region so that the second region is wider on the first region side, and the first region is narrower.

Figure 15:
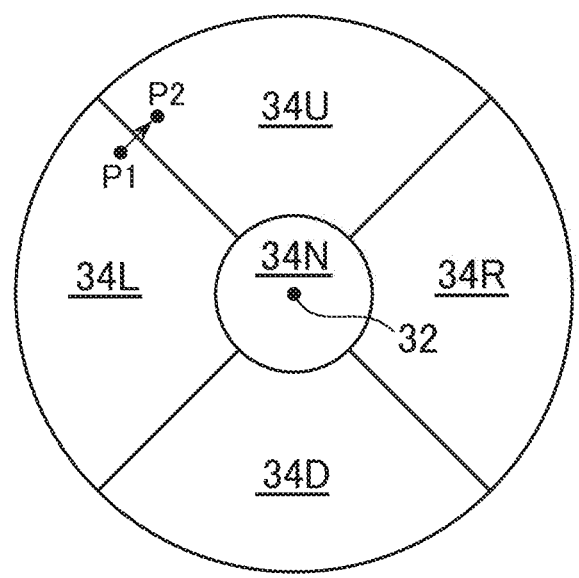
FIG. 15 is a diagram for illustrating a function of a region setting unit.
Figure 16:
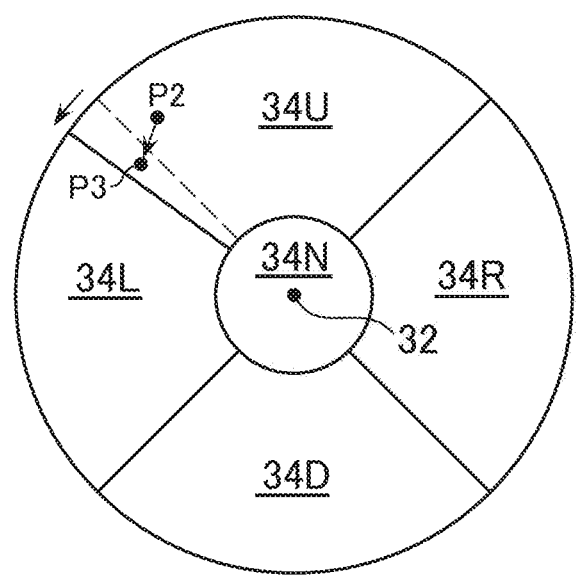
FIG. 16 is a diagram for illustrating a function of a region setting unit.

FIG. 15 and FIG. 16 are diagrams for illustrating the function of the region setting unit 60 in this case. In FIG. 15, there is illustrated a case in which the touch position by the user has changed from the position P1 in the left region 34L to the position P2 in the up region 34U. In this case, vibrations are generated by the vibration control unit 54. Further, in this case, as illustrated in FIG. 16, the region setting unit 60 is configured to change the boundary between the left region 34L and the up region 34U so that the up region 34U is wider on the left region 34L side, and the left region 34L is narrower.

In this case, even when the touch position by the user changes slightly toward the left region 34L from the position P2, because the boundary between the left region 34L and the up region 34U has changed, it is less likely that the touch position by the user is included in the left region 34L. As a result, it is less likely that vibrations are generated. In other words, as illustrated in FIG. 16, even when the touch position by the user has changed from the position P2 to the position P3, the touch position by the user is no longer included in the left region 34L, and hence vibrations are not generated. With this configuration, even when the touch position by the user has changed near a region boundary, vibrations can still be prevented from being continuously generated more than is necessary.

Modified Example 1-2

Further, for example, the region setting unit 60 may be configured to set the directional pad 30 (up region 34U, down region 34D, left region 34L, and right region 34R) based on the touch position.

For example, the region setting unit 60 may be configured to initially set, when the touch position has changed from a state in which the touch position is not detected to a state in which the touch position is detected, the position of the directional pad 30 based on the touch position detected by the touch panel 14T. For example, the region setting unit 60 may be configured to determine the touch position detected by the touch panel 14T to be the reference position 32 of the directional pad 30.

In addition, for example, the region setting unit 60 may be configured to change (correct), when the touch position has changed from being in the directional pad 30 to being outside the directional pad 30, the position of the directional pad 30 based on the touch position. For example, the region setting unit 60 may be configured to move the directional pad 30 so that the touch position is included in the regions of the directional pad 30. For example, the region setting unit 60 may also be configured to move the directional pad 30 in the direction from the reference position 32 of the directional pad 30 toward the touch position. However, the region setting unit 60 may also be configured to not move the directional pad 30 when the directional pad 30 and the touch position are too far apart. For example, the region setting unit 60 may be configured to move the directional pad 30 only when the distance between the reference position 32 of the directional pad 30 and the touch position is within a predetermined distance.

With this configuration, the position of the directional pad 30 may be set based on the touch position by the user. As a result, less effort is required by the user to adjust the touch position based on the position of the directional pad 30, which allows user operability to be improved.

Modified Example 1-3

Further, for example, the region setting unit 60 may also be configured to move, when the touch position has been detected after having changed from a state in which the touch position is detected to a state in which the touch position is not detected, the directional pad 30 (up region 34U, down region 34D, left region 34L, and right region 34R) based on the touch position.

A case is now described in which the position P2 has been detected as the touch position after the touch position has changed from a state in which the position P1 is detected as the touch position to a state in which the touch position is not detected. In this case, the positions P1 and P2 are assumed to be positions within the directional pad 30.

In this case, for example, the region setting unit 60 is configured to determine whether or not the positions P1 and P2 are close. For example, the region setting unit 60 is configured to determine whether or not the distance between the positions P1 and P2 is within a predetermined distance. Further, the region setting unit 60 may be configured to move, when the distance is within the predetermined distance, the directional pad 30 so that the positional relationship between the directional pad 30 (reference position 32) and the position P2 and the positional relationship between the directional pad 30 (reference position 32) and the position P1, match. In other words, the region setting unit 60 may be configured to move the directional pad 30 so that the relative position of the position P2 with respect to the reference position 32 matches the relative position of the position P1 with respect to the reference position 32.

When the positions P1 and P2 are close, there is a high likelihood that the user intends to touch the same position in the directional pad 30. Regarding this point, the above-mentioned configuration enables the position of the directional pad 30 to be set based on the intention of the user. As a result, less effort is required by the user to adjust the touch position based on the position of the directional pad 30, which allows user operability to be improved.

Modified Example 2

For example, the vibration control unit 54 may also be configured to change the vibration mode when causing the touch panel 14T to vibrate. The expression "change the vibration mode" means to change, for example, the magnitude (amplitude), length, or interval (frequency) of the vibrations.

Figure 17:
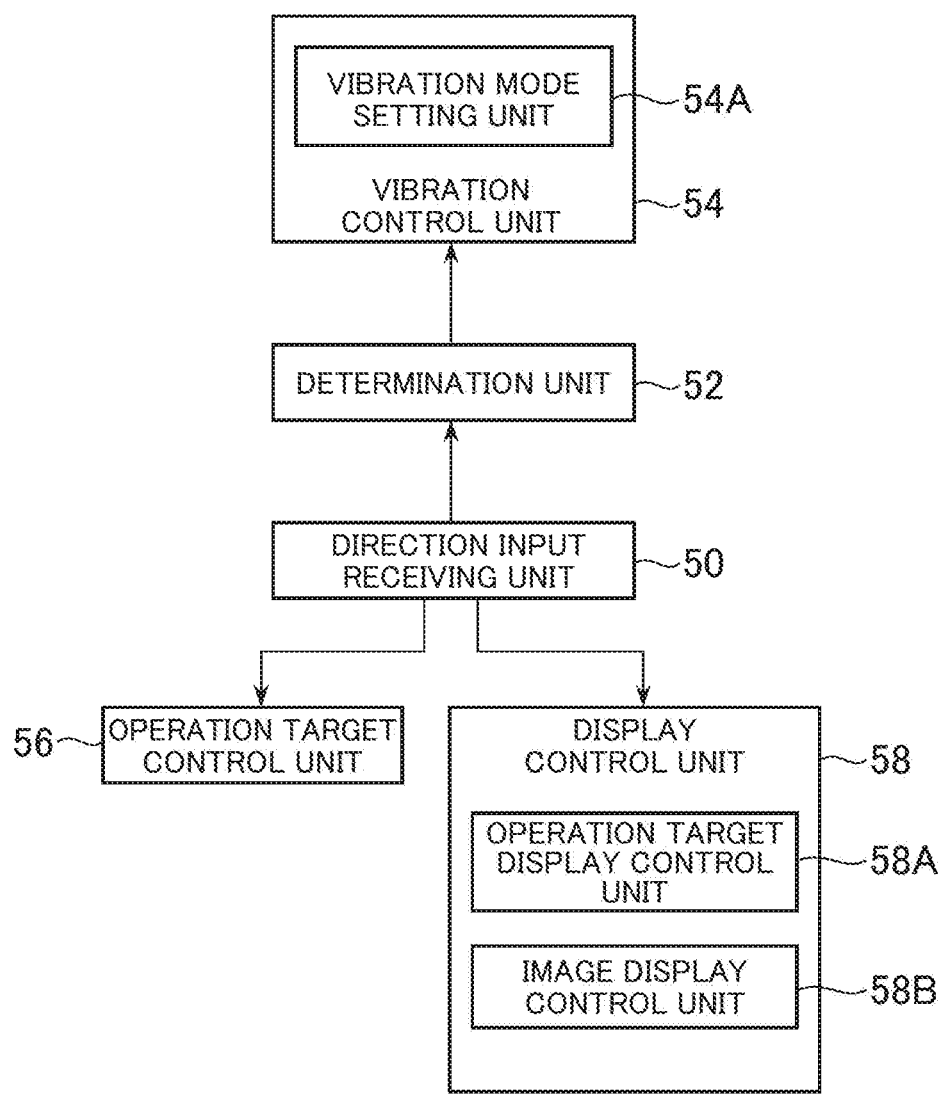
FIG. 17 is a function block diagram of the game device.

In FIG. 17, a function block diagram for such a case is illustrated. The function block diagram illustrated in FIG. 17 is different from FIG. 10 in that the vibration control unit 54 includes a vibration mode setting unit 54A. The function blocks other than the vibration control unit 54 (vibration mode setting unit 54A) are the same as those illustrated in FIG. 10, and hence in the following description, only the vibration control unit (vibration mode setting unit 54A) is described.

Modified Example 2-1

For example, the vibration mode setting unit 54A may be configured to set, when the touch position has changed from being in one region to being in another region among the up region 34U, the down region 34D, the left region 34L, and the right region 34R, based on a rate of change in the touch position at a predetermined timing, the vibration mode in the case of causing the touch panel to vibrate.

The "predetermined timing" is the timing at which the touch position changed from being in one region to being in another region. The "predetermined timing" may be the timing immediately before the touch position changes from being in one region to being in another region, or may be the timing after the touch position changed from being in one region to being in another region. For example, the "predetermined timing" may be the timing at which, after the touch position changed from being in one region to being in another region, the touch position changed from being in the vibration delay region 40 to being outside the vibration delay region 40 in the another region.

Further, the "rate of change in the touch position" is the amount of change in the touch position per predetermined time interval (e.g., unit time). In other words, the "rate of change in the touch position" is the movement distance of the touch position during a predetermined time interval (e.g., unit time). The rate of change in the touch position at a given timing T1 is acquired by, for example, dividing a distance (amount of change in the touch position) between the touch position at the timing T1 and the touch position at a timing T2, which is before the timing T1, by the time between the timings T1 and T2.

When setting the vibration mode based on the rate of change in the touch position, correspondence relationship data representing a correspondence relationship between the rate of change in the touch position and the vibration mode becomes necessary. In FIG. 18, an example of the correspondence relationship data is shown. In FIG. 18, an example of the correspondence relationship data when the magnitude of vibration is changed based on a rate of change (v) in the touch position is shown. In the example shown in FIG. 18, when the rate of change (v) in the touch position is faster, the magnitude of vibration is larger. In this case, the vibration mode setting unit 54A is configured to determine the magnitude of vibration based on the rate of change in the touch position at the predetermined timing and the correspondence relationship data shown in FIG. 18.

With this configuration, assistance may be provided so that the user can grasp the rate of change in the touch position based on the vibration mode.

Modified Example 2-2

For example, the vibration mode setting unit 54A may be configured to set, when the touch position has changed from being in one region to being in another region among the up region 34U, the down region 34D, the left region 34L, and the right region 34R, based on the touch position at a predetermined timing, the vibration mode in the case of causing the touch panel to vibrate. The "predetermined timing" is the same as in Modified Example 2-1.

For example, the vibration mode setting unit 54A is configured to set, based on the distance between the touch position at the predetermined timing and the reference position 32, the vibration mode in the case of causing the touch panel to vibrate.

When setting the vibration mode based on the touch position, correspondence relationship data representing a correspondence relationship between the touch position and the vibration mode becomes necessary. For example, when setting the vibration mode based on the distance between the touch position and the reference position 32, correspondence relationship data representing a correspondence relationship between the distance and the vibration mode becomes necessary. In FIG. 19, an example of the correspondence relationship data is shown. In FIG. 19, an example of the correspondence relationship data when the magnitude of vibration is changed based on a distance (d) is shown. In the example shown in FIG. 19, when the distance (d) is longer, the magnitude of vibration is larger. In this case, the vibration mode setting unit 54A is configured to determine the magnitude of vibration based on the distance at the predetermined timing and the correspondence relationship data shown in FIG. 19.

With this configuration, assistance may be provided so that the user can grasp based on the vibration mode the touch position (how far the touch position by the user is from the reference position 32) when the touch region by the user has changed.

Modified Example 3

For example, the vibration control unit 54 may be configured to execute control for causing the touch panel 14T to vibrate even when the touch position has changed from being in any one region among the up region 34U, the down region 34D, the left region 34L, and the right region 34R to being in a region other than those regions.

Figure 20:
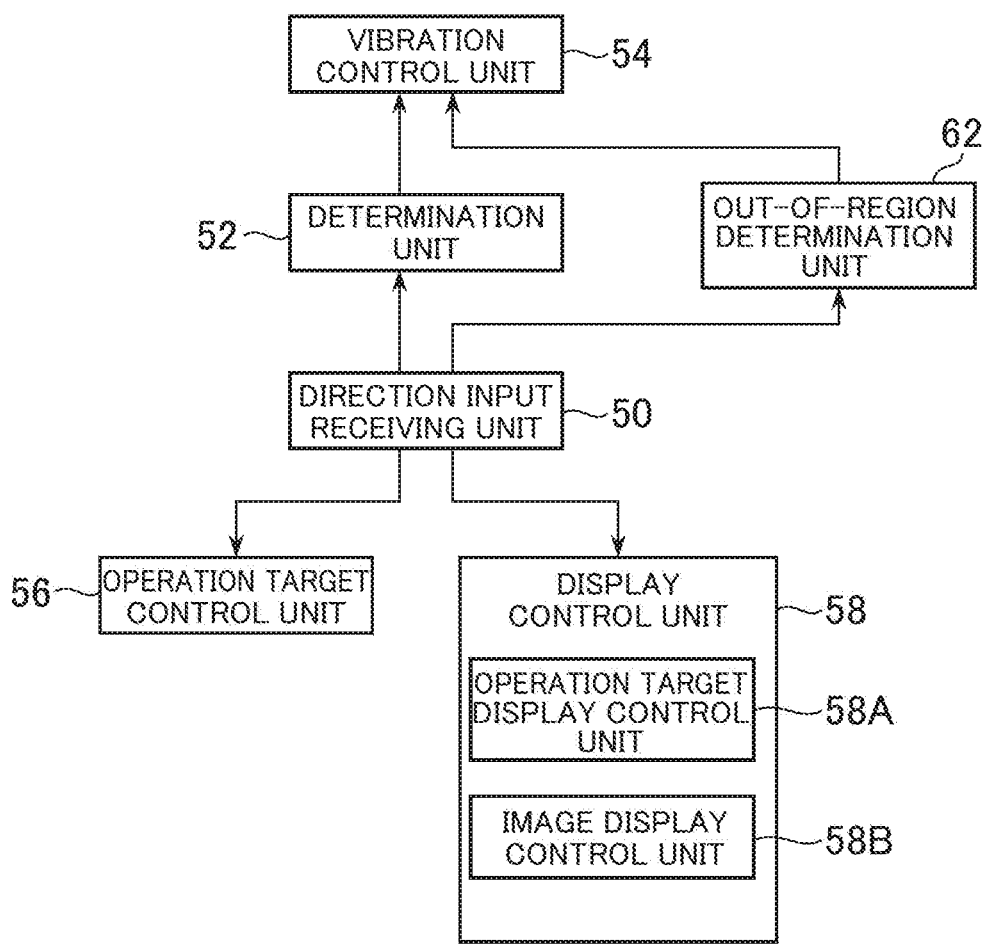
FIG. 20 is a function block diagram of the game device.

In FIG. 20, a function block diagram for such a case is illustrated. The function block diagram illustrated in FIG. 20 is different from FIG. 10 in that the game device 10 includes an out-of-region determination unit 62. Similarly to the other function blocks, the out-of-region determination unit 62 is also configured to be implemented by the control unit 11. The function blocks other than the out-of-region determination unit 62 and the vibration control unit 54 are the same as those illustrated in FIG. 10, and hence in the following description, only the out-of-region determination unit 62 and the vibration control unit 54 are described.

The out-of-region determination unit 62 is configured to determine, for example, whether or not the touch position has changed from being in any one region among the up region 34U, the down region 34D, the left region 34L, and the right region 34R to being in a region other than the directional pad 30 (region outside the directional pad 30). The vibration control unit 54 is configured to execute, when it is determined that there has been such a change, control for causing the touch panel 14T to vibrate.

The vibration control unit 54 may also be configured to differentiate the vibration mode (e.g., magnitude, length, or frequency) in this case from the vibration mode used when there has been a change from one region to another region among the up region 34U, the down region 34D, the left region 34L, and the right region 34R. For example, the vibration control unit 54 may be configured to increase the magnitude of vibration in this case to be larger than the magnitude of vibration used when there has been a change from one region to another region among the up region 34U, the down region 34D, the left region 34L, and the right region 34R.

With this configuration, assistance may be provided so that the user can grasp the fact that the touch position has changed from being in the directional pad 30 to being outside the directional pad 30.

Modified Example 4

The operation target display control unit 58A may also be configured to set, for example, the position of the butterfly character 24 so that the "direction from the user character 22 to the butterfly character 24" corresponds to the "direction corresponding to the region in which the touch position is included".

For example, the operation target display control unit 58A may be configured to display, when the touch position is included in the up region 34U, the butterfly character 24 directly above the user character 22. Further, for example, the operation target display control unit 58A may be configured to display, when the touch position is included in the left region 34L, the butterfly character 24 to the left of the user character 22 as seen from the user. Even With this configuration, assistance may be provided so that the user, while focusing on the user character 22, can grasp the direction that the user has instructed.

Modified Example 5

The present invention is capable of being applied even to a game system including a server and a game device. In other words, the present invention is capable of being applied even to a game executed while data communication is being performed between the server and the game device.

Figure 21:
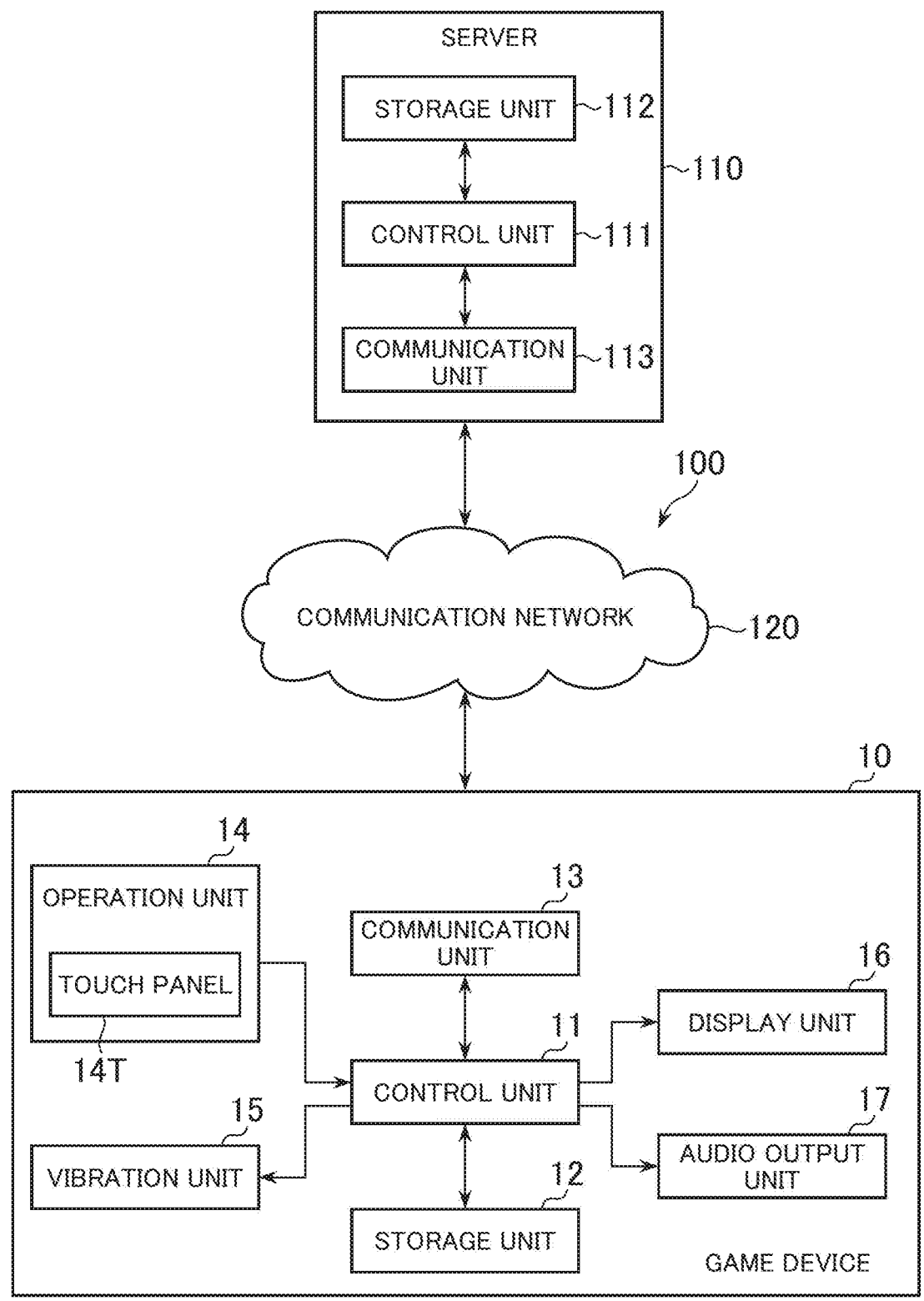
FIG. 21 is a diagram for illustrating an example of an overall configuration of a game system.

In FIG. 21, an overall configuration of the game system according to another embodiment of the present invention is illustrated. As illustrated in FIG. 21, a game system 100 includes a server 110 and the game device 10. The server 110 and the game device 10 are connected to a communication network 120. As a result, data can be communicated between the server 110 and the game device 10.

The server 110 is implemented by, for example, a server computer. As illustrated in FIG. 21, the server 110 includes a control unit 111, a storage unit 112, and a communication unit 113. The control unit 111, the storage unit 112, and the communication unit 113 are the same as the control unit 11, the storage unit 12, and the communication unit 13 of the game device 10. Programs and data are supplied to the server 110 via the communication network 120, for example. The server 110 may also be configured to include components for reading programs or data stored in an information storage medium (e.g., an optical disc, a memory card, etc.). Programs and data may be supplied to the server 110 via the information storage medium.

In this case, the function blocks illustrated in FIG. 10, FIG. 17, and FIG. 20 may be implemented by the control unit 111 of the server 110, or implemented by the control unit 11 of the game device 10. For example, all of the function blocks may be implemented by the server 110 (game control device). Further, a part of the function blocks may be implemented by the game device 10, and the remaining function blocks implemented by the server 110.

When the determination unit 52 is implemented by the server 110, for example, data indicating a reception result of the direction input receiving unit 50 is transmitted from the game device 10 to the server 110, and the determination performed by the determination unit 52 is executed based on that data.

Further, when the direction input receiving unit 50 is implemented by the server 110, for example, data indicating a detection result of the touch panel 14T is transmitted from the game device 10 to the server 110, and the determination regarding which region the touch position is included in among the up region 34U, the down region 34D, the left region 34L, and the right region 34R, is performed by the direction input receiving unit 50 (server 110).

In addition, when the vibration control unit 54 is implemented by the server 110, for example, the vibration control unit 54 (server 110) causes the touch panel 14T (e.g., the game device 10, which is a terminal device including the touch panel 14T) to vibrate by transmitting to the game device 10 data instructing that the vibration unit 15 is to be driven.

Still further, when the display control unit 58 is implemented by the server 110, for example, the display control unit 58 (server 110) displays the game screen 20 on the display unit 16 by transmitting to the game device 10 data for displaying the game screen 20.

Other Modified Examples

For example, a plurality of the above-mentioned Modified Examples 1 to 5 may be combined.

For example, the operation target control unit 56, the operation target display control unit 58A, and the image display control unit 58B are not essential, and those units may be omitted. Further, for example, it is not essential to display the butterfly character 24. In addition, for example, it is not essential to set the vibration delay region 40 and the neutral region 34N.

Further, for example, in the embodiments described above, a human-like game character, such as the user character 22, is used as the user's operation target. However, the user's operation target is not limited to a human-like game character. In addition, in the embodiments described above, the butterfly character 24 is displayed in association with the user character 22. However, a character other than the butterfly character 24 may be displayed in association with the user character 22, or an image other than a character (e.g., mark, cursor, icon, etc.) may be displayed in association with the user character 22.

Still further, for example, the present invention is capable of being applied to a game in which the user performs a direction input operation. In other words, the present invention is capable of being applied to a game in which the user performs a direction input operation by using a virtual directional pad (or directional button or directional lever). The present invention is also capable of being applied to a game other than the game described above. For example, the present invention is capable of being applied to various games, such as a sports game (e.g., soccer game, baseball game, ice hockey game, or basketball game), a role-playing game, a fighting game, an action game, a shooting game, a puzzle game, and the like.

[Supplemental]

From the description given above, the present invention is understood as follows, for example.

A game control device according to one embodiment of the present invention includes at least one processor configured to: receive direction input by determining which region, among a plurality of regions set so as to respectively correspond to a plurality of directions, a touch position detected by a touch panel is included in; determine whether or not the touch position has changed from being in one region to being in another region among the plurality of regions; and cause the touch panel to vibrate if the touch position has changed from being in the one region to being in the another region.

A game system according to one embodiment of the present invention includes at least one processor configured to: receive direction input by determining which region, among a plurality of regions set so as to respectively correspond to a plurality of directions, a touch position detected by a touch panel is included in; determine whether or not the touch position has changed from being in one region to being in another region among the plurality of regions; and cause the touch panel to vibrate if the touch position has changed from being in the one region to being in the another region.

The program according to one embodiment of the present invention causes a computer to: receive direction input by determining which region, among a plurality of regions set so as to respectively correspond to a plurality of directions, a touch position detected by a touch panel is included in; determine whether or not the touch position has changed from being in one region to being in another region among the plurality of regions; and execute control for causing the touch panel to vibrate if the touch position has changed from being in the one region to being in the another region.

The computer-readable information storage medium of one embodiment of the present invention is a computer-readable information storage medium having the above-mentioned program stored thereon.

According to one aspect of the present invention, the at least one processor further sets an orientation of a user's operation target so that the user's operation target faces a direction corresponding to, among the plurality of regions, the region in which the touch position is included.

According to one aspect of the present invention, the plurality of regions comprising a first region, and a second region adjacent to the first region, the second region comprising a third region set near a boundary with the first region, and if the touch position has changed from being in the first region to being in the second region, the at least one processor further delays the touch panel from being caused to vibrate until the touch position is in a state of being included in a region other than the third region included in the second region.

According to one aspect of the present invention, the plurality of regions comprising a first region, and a second region adjacent to the first region, and if the touch position has changed from being in the first region to being in the second region, the at least one processor further changes a boundary between the first region and the second region so that the second region is wider on the first region side, and that the first region is narrower.

According to one aspect of the present invention, the plurality of regions being set around a reference position, each of the plurality of regions comprising a reference region set near the reference position, and if the touch position has changed to being in the one region, the at least one processor further delays the touch panel from being caused to vibrate until the touch position is in a state of being included in a region other than the reference region included in the one region.

According to one aspect of the present invention, the at least one processor further sets the plurality of regions based on the touch position.

According to one aspect of the present invention, if the touch position has been detected after having changed from a state in which the touch position is detected to a state in which the touch position is not detected, the at least one processor further moves the plurality of regions based on the touch position.

According to one aspect of the present invention, the at least one processor further causes a display comprising the touch panel to display an image indicating, among the plurality of regions, a direction corresponding to the region in which the touch position is included.

According to one aspect of the present invention, the plurality of regions being set around a reference position, and the at least one processor further causes the display to display the image in association with the region in which the touch position is included among the plurality of regions at a position farther away than the touch position from the reference position.

According to one aspect of the present invention, the at least one processor further: determines whether or not the touch position has changed from being in any one region among the plurality of regions to being in a region other than the plurality of regions; and causes the touch panel to vibrate if the touch position has changed from being in the one region among the plurality of regions to being in the region other than the plurality of regions.

According to one aspect of the present invention, if the touch position has changed from being in the one region to being in the another region, the at least one processor further sets based on a rate of change in the touch position at a predetermined timing, a vibration mode in a case of causing the touch panel to vibrate.

According to one aspect of the present invention, if the touch position has changed from being in the one region to being in the another region, the at least one processor further sets based on the touch position at a predetermined timing, a vibration mode in a case of causing the touch panel to vibrate.

According to one aspect of the present invention, the plurality of regions being set around a reference position, and the at least one processor further sets, based on a distance between the touch position at the predetermined timing and the reference position, the vibration mode in the case of causing the touch panel to vibrate.

According to one aspect of the present invention, the plurality of regions being set around a reference position, and the at least one processor further: causes a display to display a user's operation target and a display target to be displayed in association with the user's operation target; and sets the position of the display target so that a direction from the user's operation target to the display target corresponds to a direction from the reference position to the touch position.

According to one aspect of the present invention, the at least one processor further: causes a display to display a user's operation target and a display target to be displayed in association with the user's operation target; and sets the position of the display target so that a direction from the user's operation target to the display target corresponds to a direction corresponding to the region in which the touch position is included.

According to one aspect of the present invention, the at least one processor further causes the game control device comprising the touch panel to vibrate.

According to one aspect of the present invention, the at least one processor further causes a terminal device comprising the touch panel to vibrate.

In the above description, in order to facilitate understanding of the present invention, the reference symbols provided in the drawings are enclosed in parentheses. However, the present invention is not to be limited to the modes illustrated in the drawings as a result of this.

What is claimed is:

1. A game control device comprising:
   a touch panel which is divided into a plurality of first regions, and a second region, where each of the plurality of first regions corresponds to a direction; and
   at least one processor configured to:
   receive direction input by determining which region a touch position detected by the touch panel is included in, among the plurality of first regions, so as to respectively correspond to a plurality of directions;
   determine whether or not the touch position is changed from being in one of the first regions to the second region, or from the second region to one of the first regions, or from being in one of the first regions to another of the first regions;
   not cause the touch panel to vibrate if the touch position was determined to change from one of the first regions to the second region;
   cause the touch panel to vibrate if the touch position was determined to have changed from being in the second region to one of the first regions;
   cause the touch panel to vibrate if the touch if it was determined that the touch position changed from being in one of the first regions to another of the first regions;
   wherein any detected touch position is a touched position sufficient to be detected as a touch by the touch panel.

2. The game control device according to claim 1, the at least one processor further sets an orientation of a user's operation target so that the user's operation target faces a direction corresponding to, among the plurality of first regions, the first region in which the touch position is included.

3. The game control device according to claim 1,
   the plurality of first regions comprising a first boundary region, and a second boundary region adjacent to the first boundary region,
   the second boundary region comprising a third boundary region set near a boundary with the first boundary region, and
   if the touch position is changed from being in the first boundary region to being in the second boundary region, the at least one processor further delays the touch panel from being caused to vibrate until the touch position is in a state of being included in a region other than the third boundary region included in the second boundary region.

4. The game control device according to claim 1,
   the plurality of first regions comprising a first boundary region, and a second boundary region adjacent to the first boundary region, and
   if the touch position is changed from being in the first boundary region to being in the second boundary region, the at least one processor further changes a boundary between the first boundary region and the second boundary region so that the second boundary region is wider on the first boundary region side, and that the first boundary region is narrower.

5. The game control device according to claim 1,
   the plurality of first regions and second region being set around a reference position,
   each of the plurality of first regions and second region comprising a reference region set near the reference position, and
   if the touch position is changed to being in the one of the first regions and second region, the at least one processor further delays the touch panel from being caused to vibrate until the touch position is in a state of being included in a region other than the reference region included in the one of the first regions and second region.

6. The game control device according to claim 1, the at least one processor further sets the plurality of first regions and second region based on the touch position.

7. The game control device according to claim 1, if the touch position has been detected after having changed from a state in which the touch position is detected to a state in which the touch position is not detected, the at least one processor further moves the plurality of first regions and second region based on the touch position.

8. The game control device according to claim 1, the at least one processor further causes a display comprising the touch panel to display an image indicating, among the plurality of first regions, a direction corresponding to the region in which the touch position is included.

9. The game control device according to claim 8,
the plurality of first regions and second region being set around a reference position, and
the at least one processor further causes the display to display the image in association with the region in which the touch position is included among the plurality of first regions and second region at a position farther away than the touch position from the reference position.

10. The game control device according to claim 1, the at least one processor further:
determines whether or not the touch position is changed from being in any one region among the plurality of first regions and second region to being in a region other than the plurality of first regions and second region; and
causes the touch panel to vibrate if the touch position is changed from being in the one of the first regions and second region among the plurality of first regions and second region to being in the region other than the plurality of first regions and second region.

11. The game control device according to claim 1, if the touch position is changed from being in the one of the first regions or the second region to being in the another of the first regions, the at least one processor further sets, based on a rate of change in the touch position at a predetermined timing, a vibration mode in a case of causing the touch panel to vibrate.

12. The game control device according to claim 1, if the touch position is changed from being in the one of the first regions and second region to being in the another of the first regions, the at least one processor further sets based on the touch position at a predetermined timing, a vibration mode in a case of causing the touch panel to vibrate.

13. The game control device according to claim 12,
the plurality of first regions and second region being set around a reference position, and
the at least one processor further sets, based on a distance between the touch position at the predetermined timing and the reference position, the vibration mode in the case of causing the touch panel to vibrate.

14. The game control device according to claim 1,
the plurality of first regions and second region being set around a reference position, and
the at least one processor further:
causes a display to display a user's operation target and a display target to be displayed in association with the user's operation target; and sets the position of the display target so that a direction from the user's operation target to the display target corresponds to a direction from the reference position to the touch position.

15. The game control device according to claim 1, the at least one processor further:
causes a display to display a user's operation target and a display target to be displayed in association with the user's operation target; and
sets the position of the display target so that a direction from the user's operation target to the display target corresponds to a direction corresponding to the region in which the touch position is included.

16. The game control device according to claim 1, the at least one processor further causes the game control device comprising the touch panel to vibrate.

17. The game control device according to claim 1, the at least one processor further causes a terminal device comprising the touch panel to vibrate.

18. A game system comprising at least one processor configured to:
receive direction input by determining which region, among a plurality of first regions set so as to respectively correspond to a plurality of directions and a second region, a touch position detected by a touch panel is included in;
determine whether or not the touch position is changed from being in one of the first regions to the second region, or from the second region to one of the first regions, or from being in one of the first regions to another of the first regions;
not cause the touch panel to vibrate if the touch position was determined to change from one of the first regions to the second region;
cause the touch panel to vibrate if the touch position was determined to have changed from being in the second region to one of the first regions;
cause the touch panel to vibrate if the touch if it was determined that the touch position changed from being in one of the first regions to another of the first regions;
wherein any detected touch position is a touched position sufficient to be detected as a touch by the touch panel.

19. A non-transitory computer-readable information storage medium having recorded thereon a program for causing a computer to:
receive direction input by determining which region, among a plurality of first regions set so as to respectively correspond to a plurality of directions and a second region, a touch position detected by a touch panel is included in;
determine whether or not the touch position is changed from being in one of the first regions to the second region, or from the second region to one of the first regions, or from being in one of the first regions to another of the first regions;
not cause the touch panel to vibrate if the touch position was determined to change from one of the first regions to the second region;
cause the touch panel to vibrate if the touch position was determined to have changed from being in the second region to one of the first regions;

cause the touch panel to vibrate if the touch if it was determined that the touch position changed from being in one of the first regions to another of the first regions;
wherein any detected touch position is a touched position sufficient to be detected as a touch by the touch panel.

\* \* \* \* \*